US011488589B1

(12) United States Patent
Fregly et al.

(10) Patent No.: US 11,488,589 B1
(45) Date of Patent: Nov. 1, 2022

(54) TRANSITIONING VOICE INTERACTIONS

(71) Applicant: VERISIGN, INC., Reston, VA (US)

(72) Inventors: Andrew Fregly, Leesburg, VA (US);
Andrew Kaizer, Arlington, VA (US);
Burton S. Kaliski, Jr., McLean, VA
(US); Patrick Kane, Ashburn, VA
(US); Swapneel Sheth, Fairfax, VA
(US); Hari Sola, Ashburn, VA (US);
Paul Tidwell, Leesburg, VA (US);
Pedro Vasquez, Leesburg, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 16/231,138

(22) Filed: Dec. 21, 2018

(51) Int. Cl.
*G10L 15/00* (2013.01)
*G10L 15/22* (2006.01)
*G10L 15/30* (2013.01)
*G10L 15/26* (2006.01)

(52) U.S. Cl.
CPC .............. *G10L 15/22* (2013.01); *G10L 15/26* (2013.01); *G10L 15/30* (2013.01); *G10L 2015/223* (2013.01)

(58) Field of Classification Search
CPC ...... G06F 3/167; G06F 40/134; G06F 3/0482; G06F 3/0488; G06F 16/95; G06F 16/90332; G06F 16/9566; G06F 16/3329; G06F 16/3338; G06F 16/3344; G06F 3/04897; G06F 9/45529; G06F 9/5005; G10L 15/30; G10L 17/22; G10L 15/20; G10L 15/32; G10L 25/54; G10L 17/24; G10L 15/00; G10L 15/22
See application file for complete search history.

(56) References Cited

U.S. PATENT DOCUMENTS

| 6,741,677 | B2 * | 5/2004 | Reformato | H04M 1/64 379/88.07 |
| 7,240,006 | B1 | 7/2007 | Brocious et al. | |
| 7,251,604 | B1 | 7/2007 | Thenthiruperai | |
| 7,313,525 | B1 | 12/2007 | Packingham et al. | |
| 7,460,652 | B2 * | 12/2008 | Chang | H04M 3/493 379/212.01 |
| 8,078,472 | B2 | 12/2011 | Resch et al. | |

(Continued)

OTHER PUBLICATIONS

S. Modak, S. Vikmani, S. Shah and L. Kurup, "Voice driven dynamic generation of webpages," 2016 International Conference on Computing Communication Control and automation (ICCUBEA), 2016, pp. 1-4. (Year: 2016).*

(Continued)

*Primary Examiner* — Edgar X Guerra-Erazo
(74) *Attorney, Agent, or Firm* — Baker Botts L.L.P.; Michael A. Sartori

(57) ABSTRACT

Techniques for processing a voice initiated request by a web server are presented. The techniques may include receiving, by a web server, request data representing a voice command to a user device, the request data including an identification of a requested webpage; determining, by the web server, that (Continued)

a response to the request data will continue a voice interaction; and providing, by the web server and to the user device, data for a voice enabled webpage associated with the requested webpage, where the data for the voice enabled webpage is configured to invoke a voice interface for the user device.

30 Claims, 18 Drawing Sheets

(56) References Cited

U.S. PATENT DOCUMENTS

| | | | | |
|---|---|---|---|---|
| 8,234,119 | B2* | 7/2012 | Dhawan | G06F 3/167 |
| | | | | 704/270 |
| 8,401,859 | B2* | 3/2013 | Dhawan | G06F 3/167 |
| | | | | 704/270.1 |
| 2002/0174177 | A1 | 11/2002 | Miesen et al. | |
| 2005/0069102 | A1* | 3/2005 | Chang | H04M 3/4938 |
| | | | | 379/88.18 |
| 2006/0161520 | A1 | 7/2006 | Brewer et al. | |
| 2007/0047719 | A1* | 3/2007 | Dhawan | G06F 3/167 |
| | | | | 379/235 |
| 2007/0123223 | A1* | 5/2007 | Letourneau | H04M 3/4938 |
| | | | | 455/414.1 |
| 2009/0164441 | A1 | 6/2009 | Cheyer | |
| 2010/0125604 | A1 | 5/2010 | Martinez et al. | |
| 2011/0060586 | A1* | 3/2011 | Dhawan | G10L 15/26 |
| | | | | 704/E15.001 |
| 2012/0123785 | A1* | 5/2012 | Dhawan | G06F 3/167 |
| | | | | 704/E15.001 |
| 2014/0337032 | A1 | 11/2014 | Aleksic et al. | |
| 2014/0365209 | A1 | 12/2014 | Evermann | |
| 2016/0127503 | A1* | 5/2016 | Danne | H04L 67/60 |
| | | | | 709/217 |

OTHER PUBLICATIONS

U.S. Office Action issued in corresponding U.S. Appl. No. 15/839,806 dated Apr. 24, 2019, pp. 1-17.
U.S. Office Action issued in corresponding U.S. Appl. No. 15/839,802 dated May 20, 2019, pp. 1-15.
Agile Salt, LLC. "Web Check." Alexa Skills Store, released Jan. 12, 2017. https:/lwww.alexaskillstore.com/WebCheck/80 1 M4NX2TM, pp. 1-2.
Andrew Allemann, "A threat to the importance of domain names." Domain Name Wire, Jan. 5, 2017, https://domainnamewire.com/2017/01/05/threat-i mportance-domain-names/, pp. 1-18.
Andrew Allemann, "A threat to the importance of domain names." Domain Name Wire, Jan. 5, 2017. See comment 2242515 in particular, https:/ldomainnamewire.com/2017/01/05/threat-importance-domain-names/#comment-2242515, pp. 1-3.
Mrouttenberg, "Can an Alexa Home Card contain a link to our web based shopping cart, following account linking", Amazon Developer Forums, Jun. 16, 2016. https://forums.developer.amazon.com/questions/29476/can-an-alexa-home-card-contain-a-link-to-our-web-b.html, pp. 1-2.
SimilarWeb. "SimilarWeb." Alexa Skills Store, released Dec. 20, 2016. https://www.alexaskillstore.com/similarWeb/801 N1 SY7 JZ, pp. 1-2.
Joel Fries, "Domain Name Info" Alexa Skills Store, released Dec. 23, 2015. https://www.alexaskillstore.com/domain-Name-Info/80 1 9R06W5A, pp. 1-2.

* cited by examiner

TRANSITIONING VOICE INTERACTIONS

FIELD OF THE VARIOUS EMBODIMENTS

Embodiments of the present disclosure relate generally to websites, and, more specifically, voice enabled webpage construction and access.

DESCRIPTION OF THE RELATED ART

A digital assistant is a device and/or application that processes requests and commands from a user to perform tasks or services for the user. Recent digital assistants, such as voice assistants, include tools to enable digital speech recognition and digital speech generation. These voice assistants typically provide a voice interface that allows users to direct a request to the voice assistant, with the voice assistant processing the user request and providing appropriate responses. Examples of voice assistants include voice interfaces integrated within a mobile device, such as Apple Siri or Google Assistant, as well as voice interfaces in stand-alone hardware, such as Amazon Echo device, which implement an Alexa interface, and Google Home with implements a Google Assistant interface.

The voice assistant interface enables a voice assistant to "listen" to an audio request from a user and provide a corresponding audio response. Many of the digital speech recognition engines in the voice assistants also can process natural language requests from users and retrieve data in response to those requests. In many instances, digital assistants connect to specific websites or services via an Internet connection to retrieve information responsive to user requests.

One drawback of using voice assistants, however, is that voice assistants oftentimes have difficulty navigating websites and/or webpages included in websites. A voice assistant may retrieve a webpage that is focused on providing visual content and links. The voice assistant cannot, however, provide the visual content or easily translate the visual content to voice. Using only voice commands to navigate within the retrieved webpage would be difficult for a user without also receiving the visual information. Voice assistants also frequently have difficulty interacting with services provided by websites that are designed to be interacted with using a keyboard, mouse, or other method applicable to a graphical user interface.

As the foregoing illustrates, what is needed in the art are more effective techniques for voice assistants to interact with websites.

SUMMARY

According to various embodiments, a method of processing a voice initiated request by a web server is disclosed. According to an embodiment, the method includes receiving, by a web server, request data representing a voice command to a user device, the request data including an identification of a requested webpage; determining, by the web server, that a response to the request data will continue a voice interaction; and providing, by the web server and to the user device, data for a voice enabled webpage associated with the requested webpage, where the data for the voice enabled webpage is configured to invoke a voice interface for the user device.

According to an embodiment, the method may include other features, as described below. The request data may include textual data derived from the voice command. The determining may include parsing the identification of the web page for an indication that a response to the request data will continue a voice interaction. The determining may include retrieving stored data representing that a response to the request data will continue a voice interaction. The request data may further include at least one word, where the determining further includes identifying a uniform resource identifier (URI) of the voice enabled webpage from at least both the identification of the webpage and the at least one word. The identifying may include retrieving data associating the at least one word and the identification of the webpage to the URI of the voice enabled webpage, where the retrieving data is from one of: a Domain Name System (DNS) registry for the webpage, a DNS registrar for the webpage, a web hosting provider for the webpage, or the web server. The method may include, prior to the providing, providing a redirect instruction and an indication of an in-progress voice interaction to an identity provider website, where the redirect instruction includes a uniform resource identifier of the voice enabled webpage; receiving identity information from the identity provider website; and determining that the identity information indicates that a sender of the request data is authorized for an action on the voice enabled webpage. The request data may further include an identification of a secondary webpage; where the data for the voice enabled webpage is configured to invoke the voice interface on the user device to prompt a user for at least one parameter; and the method may further include: receiving, by the web server and from the user device, the at least one parameter; and providing, by the web server and to the user device, a redirect instruction to the secondary webpage, the redirect instruction including an indication of an in-progress voice interaction and the at least one parameter. The method may include receiving, by the web server and from the user device, a redirect response initiated by the secondary webpage, the redirect response including voice response data from the secondary webpage; and passing the voice response data to the user device, such that the voice interface of the user device audibly delivers the voice response data to the user. The data for the voice enabled webpage may be configured to invoke the voice interface on the user device to prompt a user for at least one parameter, and the method may further include: determining, by the web server, that a secondary webpage is implicated by the request data, where the data for the voice enabled webpage is configured to invoke the voice interface on the user device to prompt a user for at least one parameter; receiving, by the web server and from the user device, the at least one parameter; sending, by the web server and to a secondary web server for the secondary web page, an indication of an in-progress voice interaction and an instruction to coordinate through the web server; receiving, by the web server and from the secondary web server, a response including a uniform resource identifier for a secondary voice enabled webpage; and sending, by the web server and to a sender of the request data, a first redirect instruction including the uniform resource identifier for the secondary voice enabled webpage, where the first redirect instruction further includes a second redirect instruction including a uniform resource identifier for the web server. The method may include providing, by the web server and to the user device, shared secret data for presentation by the voice interface of the user device. The request data may include at least one search qualifier, and the data for the voice enabled webpage may include search results constrained by the at least one search qualifier. The data for the voice enabled webpage may be configured to invoke a voice interface for the user device by invoking a voice assistant for the user device. The data for the voice enabled webpage may include executable code including at least a portion of the voice interface for the user device. The method may include receiving, by the web server, an authentication token associated with a user of the user device prior to the providing.

According to various embodiments, a system for processing a voice initiated request by a web server is disclosed. According to an embodiment, the system includes a web server configured to perform operations including: receiving request data representing a voice command to a user device, the request data including an identification of a requested webpage; determining that a response to the request data will continue a voice interaction; and providing, to the user device, data for a voice enabled webpage associated with the requested webpage, where the data for the voice enabled webpage is configured to invoke a voice interface for the user device.

According to an embodiment, the method may include other features, as described below. The request data may include textual data derived from the voice command. The determining may include parsing the identification of the web page for an indication that a response to the request data will continue a voice interaction. The determining may include retrieving stored data representing that a response to the request data will continue a voice interaction. The request data may further include at least one word, and the determining may further include identifying a uniform resource identifier (URI) of the voice enabled webpage from at least both the identification of the webpage and the at least one word. The identifying may include retrieving data associating the at least one word and the identification of the webpage to the URI of the voice enabled webpage, where the retrieving data is from one of: a Domain Name System (DNS) registry for the webpage, a DNS registrar for the webpage, a web hosting provider for the webpage, or the web server. The operations may further include, prior to the providing: providing a redirect instruction and an indication of an in-progress voice interaction to an identity provider website, where the redirect instruction includes a uniform resource identifier of the voice enabled webpage; receiving identity information from the identity provider website; and determining that the identity information indicates that a sender of the request data is authorized for an action on the voice enabled webpage. The request data may further include an identification of a secondary webpage; and the data for the voice enabled webpage may be configured to invoke the voice interface on the user device to prompt a user for at least one parameter; where the operations may further include: receiving, from the user device, the at least one parameter; and providing, to the user device, a redirect instruction to the secondary webpage, the redirect instruction including an indication of an in-progress voice interaction and the at least one parameter. The operations may further include: receiving, from the user device, a redirect response initiated by the secondary webpage, the redirect response including voice response data from the secondary webpage; and passing the voice response data to the user device, such that the voice interface of the user device audibly delivers the voice response data to the user. The data for the voice enabled may be configured to invoke the voice interface on the user device to prompt a user for at least one parameter, and the operations may further include: determining that a secondary webpage is implicated by the request data, where the data for the voice enabled webpage is configured to invoke the voice interface on the user device to prompt a user for at least one parameter; receiving from the user device, the at least one parameter; sending, to a secondary web server for the secondary web page, an indication of an in-progress voice interaction and an instruction to coordinate through the web server; receiving, from the secondary web server, a response including a uniform resource identifier for a secondary voice enabled webpage; and sending, to a sender of the request data, a first redirect instruction including the uniform resource identifier for the secondary voice enabled webpage, where the first redirect instruction further includes a second redirect instruction including a uniform resource identifier for the web server. The operations may further include: providing, to the user device, shared secret data for presentation by the voice interface of the user device. The request data may include at least one search qualifier, and the data for the voice enabled webpage may include search results constrained by the at least one search qualifier. The data for the voice enabled webpage may be configured to invoke a voice interface for the user device by invoking a voice assistant for the user device. The data for the voice enabled webpage may include executable code including at least a portion of the voice interface for the user device. The operations may further include receiving an authentication token associated with a user of the user device prior to the providing.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
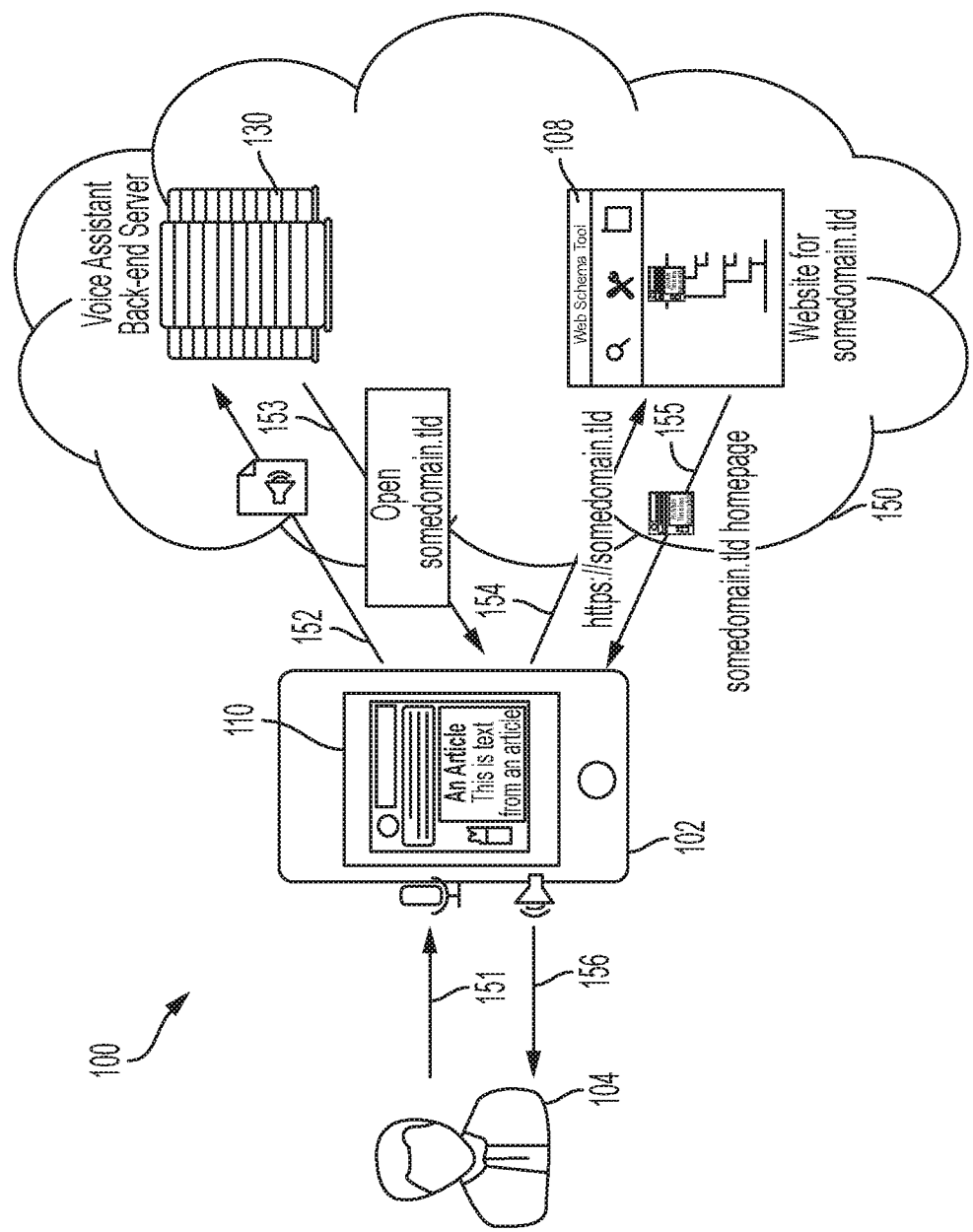
FIG. 1 is a schematic diagram of a user device based voice assistant system.

In the following description, numerous specific details are set forth to provide a more thorough understanding of the various embodiments. However, it will be apparent to one of skilled in the art that the inventive concepts may be practiced without one or more of these specific details.

Some embodiments provide techniques for an existing voice assistant to process a voice request by relaying control and user utterances to a requested voice-enabled webpage. Some embodiments provide a voice interface through such a voice-enabled webpage via a browser of a user's device. Such embodiments may permit the browser to facilitate a voice interaction with the user in servicing a voice request originally made to a voice assistant. Some embodiments allow for propagating and returning control of voice interactions between voice assistants and websites.

This disclosure is organized as follows. Section I presents techniques for transitioning from a voice assistant to a voice-enabled webpage. Section II presents techniques for acquiring, configuring, provisioning, and utilizing voice-enabled webpages. In particular, Section II presents techniques for acquiring, configuring, and provisioning voice-enabled webpages, and for configuring and using key-value pairs. Section III presents various extensions, alternatives, and use cases for the techniques disclosed in Sections I and II. In particular, Section III presents techniques for establishing user identity, transitioning between multiple voice-enabled webpages, facilitating non-browser interactions between voice assistants and voice-enabled webpages, providing audible trust indicators, using and interacting with search engines, and utilizing alternatives to voice assistants.

I. Transitioning a Voice Interaction

Voice assistants provided by mobile devices now support the capability of opening a webpage based on a voice command that indicates a domain name to be opened. When a webpage is opened, the page is displayed in the default web browser for the device. However, currently, all that happens when a voice assistant on a mobile device is asked to open a website is that the home page for the website is displayed in the default browser of the device. Once this happens, the user is back to interacting with the website by tapping and typing on the screen of the mobile device.

Some embodiments utilize this capability as a building block for allowing mobile devices interacting with websites to provide capabilities similar to those provided by dedicated voice assistants. Thus, some embodiments provide a user with a much richer and continuous voice experience from their mobile devices. That is, some embodiments allow a user to continue interacting via voice with a website that was opened based on a voice request.

The continuing experience may allow the user to perform interactions that are amenable to voice, such as providing a command to the website for some function to be performed or inquiring for a specific piece of information the user expects to find on the website. For example, a specific function a user might want to perform is to place an order for a pizza to be delivered. In this example, the user may speak the order by saying "go to NVAPizzaReston.tld and let me order a pizza to be delivered". (In this document, the notation ".tld" is a stand-in for any true top-level domain, such as dot com, dot net, dot edu, etc.) In another example of a specific function, a user might want to schedule an appointment for a specific day and time window. In this example, the user may speak the following: "open doctorzhivagoinashburn.tld and request an appointment for early next week".

In both of these examples, a webpage of a website according to disclosed embodiments may continue the voice interaction by prompting for needed information or providing an interaction that allows the user to confirm their request. In an example of requesting a specific piece of information, a user may request a reading of the most recent financial results statement for a corporation. Additional capabilities may also be triggered based on a user's initial voice request to a website.

FIG. 1 is a schematic diagram of a user device based voice assistant system 100. As shown, system 100 includes user device 102 and voice assistant 110. User device 102 may be a personal computer, such as a desktop or laptop computer, a tablet computer, or a smart phone, for example.

According to embodiments, voice assistant 110 may be for example, but not limited to, a computer-executable software executing on user device 102, or may be a dedicated hardware device in operative communication with user device 102, e.g., via an intranet such as a WiFi or LAN network, or via a network such as the Internet. In the latter case, voice assistant 110 may be a component of a digital assistant that includes other input/output devices, such as a display, touchscreen, keyboard, keypad, mouse, controls, etc. Voice assistant 110 may utilize a microphone to capture audio from user 104 and/or one or more speakers to provide digital audio 156 to user 104. If a dedicated hardware device, voice assistant 110 may include such a microphone and/or speaker; if executable software, voice assistant may utilize a microphone and/or speaker of user device 102.

System 100 may also include voice assistant back-end server 130. Voice assistant 110 communicates with voice assistant back-end server 130 over network 150 using connected technologies, such as wired technologies (e.g., USB, fiber optics, Ethernet, etc.), wireless technologies (e.g., RF, WiFi, Bluetooth, cellular, satellite, etc.), or other connected technologies. In general, voice assistant back-end server 130 processes captured audio to perform speech recognition operations, identify operational requests in the captured audio, and provide an applicable response to the captured audio.

Network 150 may be the internet according to some embodiments. Network 150 includes one or more network communications systems, such as routers and/or switches, configured to facilitate data communications among user device 102, voice assistant 110, voice assistant back-end server 130 and/or webserver 140. In some embodiments, communications network 150 is or includes a local area network (LAN). In some embodiments, communications network 150 is or includes a wide area network (WAN). Persons skilled in the art will recognize that many technically-feasible techniques exist for building communications network 150, including techniques for deploying internet communications networks.

System 100 may include a webserver which hosts a website that includes at least one webpage 108. For example, the webserver may store code, such as HTML, XML, JavaScript, etc., code, representing one or more webpages, e.g., webpage 108, and/or websites.

Note that system 100 may include additional voice assistant back-end servers, and/or webservers, in any combination.

In operation, user 104 may interact with voice assistant 110 by vocalizing natural language commands and/or questions. Voice assistant 110 may deliver audio responses, e.g., in natural language. In more detail, voice assistant 110 may receive a natural language request from user 104 and may send the request to voice assistant back-end server 130, which parses and analyzes the request. In particular, voice assistant back-end server 130 may perform speech recognition on the received request to identify one or more spoken words to identify a user request. Based on the contents of the request, voice assistant back-end server 130 may determine an applicable audio response and send a representation of the response to voice assistant 110. Voice assistant 110 may convert the representation into digital audio and provide an audio response to user 104, e.g., by performing playback of digital audio or by performing speech-to-text processing to dynamically create the audio.

The user request may be a specified operation, such as accessing a domain name or URI associated with a website, user 104 may speak specific words or phrases to perform specific operations, such as retrieval, in relation to one or more webpages 108 hosted by webserver 140. Thus, voice assistant back-end server 130 may directly interact with webserver 140 to generate a response to the captured audio. For example, voice assistant back-end server 130 may retrieve a website or webpage specified in the request, or may retrieve values associated with words or phrases included in the request, e.g., search results. Voice assistant back-end server 130 may retrieve an entire website or a specific webpage of a website. Voice assistant back-end server 130 may search the contents of a website for a word or phrase. Webserver 140 may then provide a response based on the results of the search in lieu of the entire webpage or website.

Alternately, or in addition, voice assistant back-end server 130 may instruct voice assistant 110 and/or user device 102 to retrieve a website or webpage specified in the request, or to retrieve from such a website or webpage values associated with words or phrases included in the request.

An example of instructing user device 102 to retrieve and display a webpage is described with respect to FIG. 1. At 151, user 104 verbally asks voice assistant 110 on user device 102 to open somedomain.tld. At 152, audio of the command is relayed to voice assistant back-end server 130. Voice assistant back-end server 130 converts the audio to text and performs natural language processing to determine that user wants to open the website somedomain.tld. At 153, voice assistant back-end server 130 provides a response that directs user device 110 to open somedomain.tld in a browser. At 154, such a browser is invoked on user device 110 to retrieve the default webpage (home page) for somedomain.tld. At 155, the browser retrieves and displays the home page for somedomain.tld.

Some embodiments provide techniques for transitioning a voice interaction from an existing voice assistant to a voice-enabled webpage. Examples of such embodiments are introduced presently.

Figure 2:
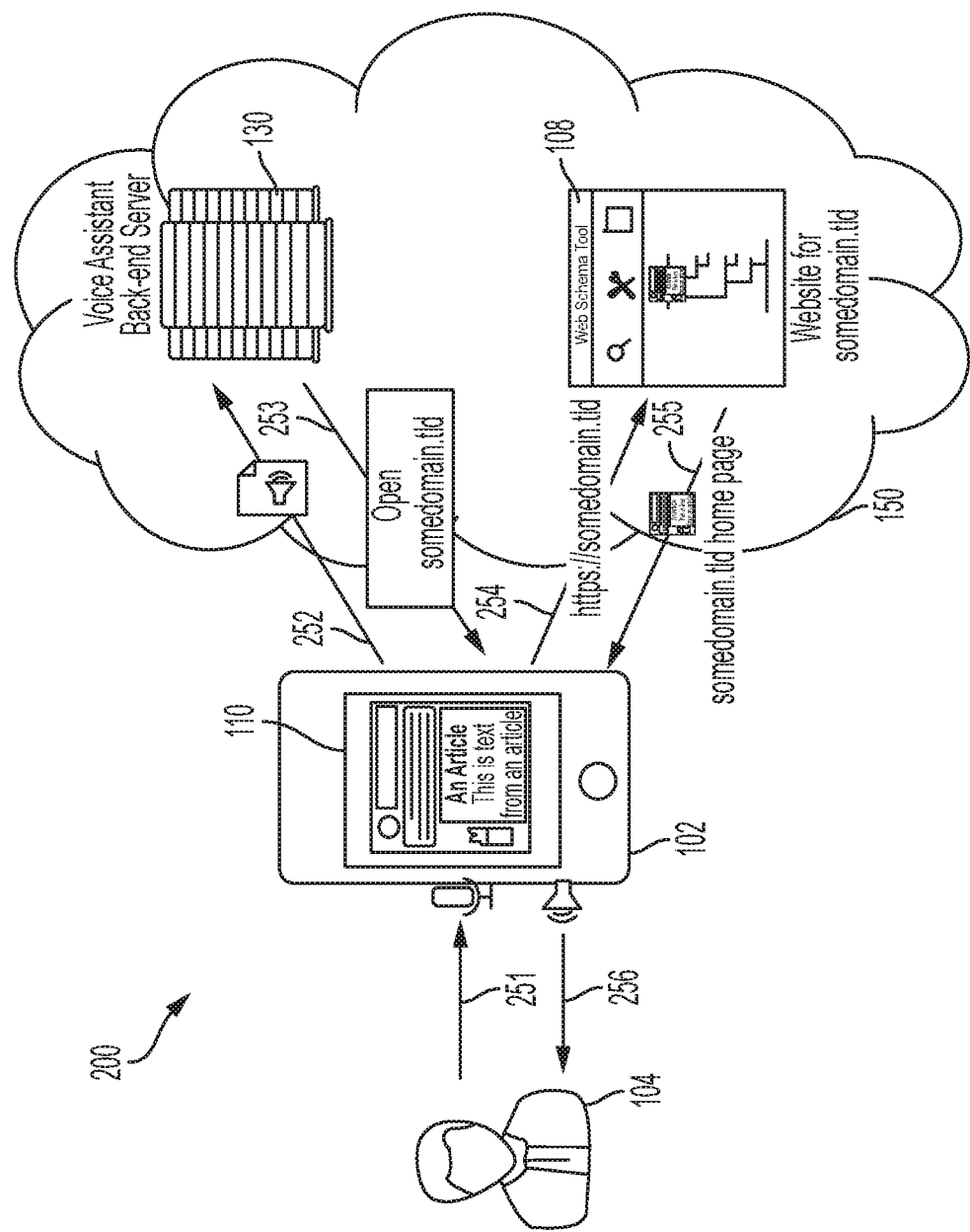
FIG. 2 is a schematic diagram of a system for transitioning a voice interaction from a voice assistant to a voice-enabled webpage, according to various embodiments.

FIG. 2 is a schematic diagram of a system 200 for transitioning a voice interaction from a voice assistant to a voice-enabled webpage, according to various embodiments. System 200 of FIG. 2 includes user device 102 and voice assistant 110, utilized by user 104. System 200 includes voice assistant back-end server 130. System 200 includes webserver 108. Unlike system 100, however, webserver 108 of FIG. 2 hosts a voice-enabled webpage.

Figure 3:
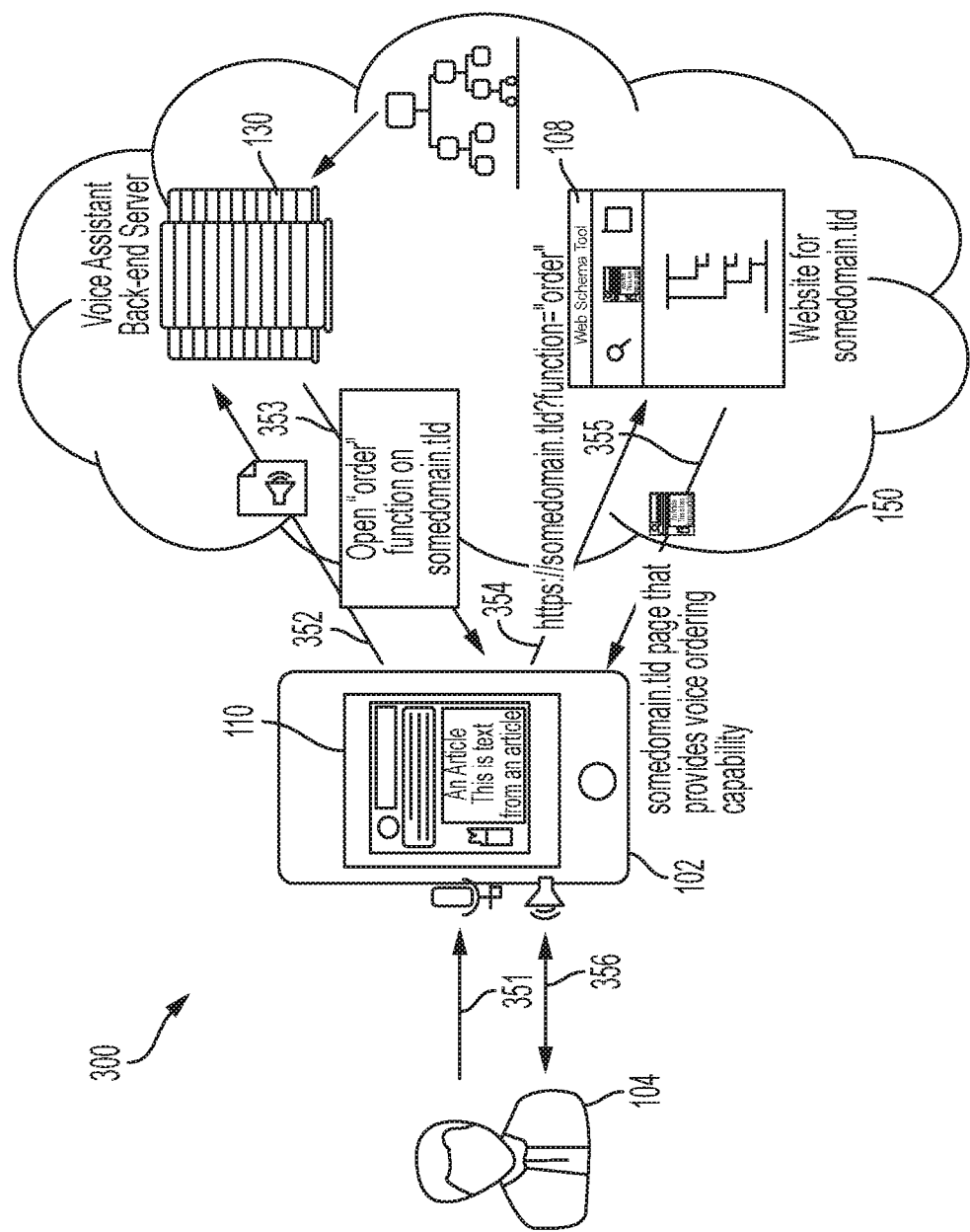
FIG. 3 is a schematic diagram of a system for identifying a function to invoke in transitioning a voice interaction from a voice assistant to a voice-enabled webpage, according to various embodiments.

An example of the operation of system 200 is described with respect to FIG. 3. At 251, user 104 asks voice assistant 110 to open somedomain.tld. At 252, voice assistant 110 relays the command to voice assistant back-end server 130. Voice assistant 110 may relay request data that represents the command to voice assistant back-end server 130. Such request data may be, for example, digital audio representing the command, may be textual data representing the command, or may include both text and digital audio. Voice assistant 110 may include speech-to-text processing capabilities. Voice assistant back-end server 130 converts the digital audio to text, if not already in possession of the speech in textual format, and performs natural language processing to determine that user 104 wants to open the website somedomain.tld. According to some embodiments, the processing performed by back-end server 130 is instead performed by user device 102.

At 253, voice assistant back-end server 130 provides a response that directs user device 102 to execute a browser and use it to open somedomain.tld. Consequently, at 254, user device 110 invokes a browser and the browser proceeds to request the default page (home page) for somedomain.tld, e.g., using an HTTP request packet with a "GET" method field.

On receiving the request for somepage.tld, server-side code at webserver 108 may determine, as described below, that user 104 made a voice request for the website, and parameterizes the returned home page so that it will initiate a voice interaction with the user. (According to some embodiments, webserver 108 may serve up a page other than the home page. This may be identified by server-side code that redirects to another page or generates a page. It is also possible that the user request identifies a page other than the home page.)

At 255, the browser executing at user device 102 retrieves and displays the returned voice-enabled webpage from somedomain.tld (or a page redirected from somedomain.tld). Executable code, such as JavaScript, in the retrieved data representing the webpage detects that a voice interaction with the user should be initiated Thus, the server for somedomain.tld may dynamically prepare a webpage with embedded JavaScript. For example, an element of the prepared JavaScript may be a JavaScript object encapsulating what the user 104 uttered initially including the intent and the various parameters and entities the user 104 spoke related to that intent. The JavaScript code in the page executes within the browser, accesses this object, and then provides the voice interface for interacting with the user to fulfill the intent. A non-limiting example of such JavaScript, in the context of a voice order for a pizza, appears below.

```
var useVoice=true;
var interaction={
   intent: "orderPizza",
   toppings: "sausage, onions",
   size: "large",
   crust: " ",
   payment: " ",
   fulfillmentMethod: " ",
   nextPromptItem: "crust",
   nextPrompt: "What type of crust would you like, thin,
      regular or thick",
   complete: false
};
if (useVoice && ! interaction.complete)
   /*the call to server.request will create a URI for the
      browser to follow with the URI interacting with the
      server and containing the interaction object plus the
      response to the next voice prompt. The server will
      then process the response and update the interaction
      object and return an updated webpage for the
      browser to render which drives the next voice inter-
      action. Alternate implementations may use cookies
      for maintaining interaction state. Other implementa-
      tions may have the JavaScript on the webpage itera-
      tively interact with the server rather than having the
      webpage updated after each interaction.
   */
   var serverURI=<code to get URI for interacting with of
      server>
   var server=new server( )
   server.requestPage(serverURI, interaction, nextPrompt
      (interaction));
}
function nextPrompt(interaction) {
   if (! interaction.complete) {
      //prompt object can scan the interaction object and
         the voicePrompt method can voice
      //prompt the user for the next needed element of the
         interaction
      return new prompt(interaction).voicePrompt( );
   }
}
```

At 256, the JavaScript provides the user with an audio prompt. The returned webpage may contain other relevant data, such as, for example but not limited to, text corresponding to the digital audio and content that augments the digital audio.

Thereafter, user 104 may interact directly with the webpage by providing audio input to the microphone of user device 110 and receiving data audibly via the speaker of user device 110. According to various embodiments, for such interactions, the voice-enabled webpage may convey digital audio representing the user's commands, textual data representing the user's commands, or both, to webserver 108.

A description of embodiments for determining that user 104 initiated the request for the webpage using a voice assistant follows. There are two main classes of techniques or embodiments for making such a determination. A first class of techniques involves providing an indication of an ongoing voice interaction in the webpage request itself. A second class of techniques involves making the determination using data external to the webpage request. These classes, and their techniques, are described presently.

According to a first class of techniques, one of voice assistant back-end server 130, voice assistant 110, or user device 102 may formulate data for a request for the webpage for somedomain.tld so that the request includes an indication of an ongoing voice interaction. For example, voice assistant back-end server 130 may, at 253, provide to user device 102 a response that includes a request for somedomain.tld to webserver 108, where the request includes an indication of an ongoing voice interaction. According to an embodiment, voice assistant 110 or user device 102 may receive a response from voice assistant back-end server 130, per 253, and subsequently formulate a request to webserver 108 that includes an indication of an ongoing voice interaction.

The indication of an ongoing voice interaction in the request to webserver 108 according to the first class of techniques may take any of a variety of forms. According to some embodiments, the request may include an indication of an ongoing voice interaction in the HTTP header of the request itself. For example, such an indication may be provided in a referrer header of the HTTP request. According to some embodiments, a query parameter in the Request-URI field of the HTTP request may indicate an ongoing voice interaction. For example, the HTTP request may include a Request-URI of the form https://somedomain.tld&voiceinteraction=true. According to some embodiments, the HTTP request may include an indication of a device type (e.g., "voice assistant") that serves as an indication that a voice interaction is ongoing. Webserver 108 may extract a device type from, for example, a USER-AGENT field of the HTTP request. Likewise, some embodiments may utilize application identity (e.g., "voiceassistant.exe") or other information from the USER-AGENT field of the HTTP request to determine that a voice interaction is ongoing. Some embodiments configure user device 102 to provide an indication of an ongoing voice interaction in its request to webserver 108. For example, voice assistant 110 or another application may configure user device 102 to detect whether the voice assistant is active when user device 102 sends an HTTP request, and, if so, formats the request to indicate such an ongoing voice interaction. The request may be formatted according to any of the techniques disclosed herein. According to some embodiments, and in general, a browser redirect from another webpage that was engaged in a voice interaction may provide an indication of an ongoing voice interaction.

The indication of an ongoing voice interaction in the request to webserver 108 according to the second class of techniques, where the indication is not included in the request itself, may take any of a variety of forms. According to some embodiments, the request may be formulated (e.g., by one of voice assistant back-end server 130, voice assistant 110, or user device 102) to be made to a known endpoint that will handle voice interactions. Such a request may be made to a particular URI or using a particular URI that includes an indication as described above in reference to the first class of techniques. Likewise, user preferences, or user behavior data, stored at user device 102 and/or at webserver 108 may indicate that a response should be made consistent with an ongoing voice interaction. According to some embodiments, session management by webserver 108 may indicate an ongoing voice interaction. Similarly, an interaction between user device 102 and webserver 108 occurring prior to the request of 254 may determine that a voice interaction is ongoing. According to some embodiments, a back-end state-management service might be engaged to provide the indicator. According to such embodiments, the back-end state-management service may further provide context to influence the voice interaction.

In general, any of the techniques of the second class may utilize indications according to techniques in the first class. According to an embodiment, combinations of techniques from either class may be combined.

FIG. 3 is a schematic diagram of a system 300 for identifying a function to invoke in transitioning a voice interaction from a voice assistant to a voice-enabled webpage, according to various embodiments. Like system 200 of FIG. 2, system 300 of FIG. 3 may include user device 102, voice assistant 110, which is utilized by user 104, and voice assistant back-end server 130. Also, like system 200, system 300 includes webserver 108. Unlike system 100, however, webserver 108 of FIG. 3 hosts a voice-enabled webpage.

An example of the operation of system 300 where user 104 invokes an "order" function of a voice-enabled webpage of a website hosted by webserver 108 is described presently. At 351, user 104 verbally requests voice assistant 110 to "order from somedomain.tld", for example. At 352, voice assistant 110 relays digital audio, and/or a textual representation thereof, of the command to voice assistant server back-end 130. (As indicated earlier, according to some embodiments, the actions of back-end server 130 are instead performed by user device 102.) Voice assistant back-end server 130 converts digital audio to corresponding text, if not already in possession of such text, and performs natural language processing to determine that user 104 wants to perform an "order" function on the website somedomain.tld. (Details of how such functions are configured, determined to be available, and used are presented in detail in Section II, below.) At 353, voice assistant back-end server 130 provides a response that directs user device 102 to open somedomain.tld in a browser and invoke the "order" function. In response, at 354, user device 102, e.g., via voice assistant 110, creates and sends a request to somedomain.tld that will invoke an "order" function. On receiving the request, server-side code on webserver 130 for somedomain.tld determines by one of many possible mechanisms (see description above in reference to FIG. 2) that the user made a voice request for the domain and wants to place an order. At 355, webserver 108 returns the appropriate voice-enabled webpage for allowing the user to perform a voice order. The voice-enabled webpage for the "order" function is displayed in the browser of user device 102. Next, at 256, code, such as JavaScript, embedded in the webpage executes to audibly prompt user 104 to speak their voice order. A voice interaction then takes place that allows user 104 to place their order.

Voice assistant back-end server 130 may parse the command to extract the keyword "order" and pass it to voice assistant 110, which passes it to webserver 108 when requesting the voice-enabled webpage. Voice assistant back-end server 130 may identify the order function based on the passed "order" digital audio or text using a variety of mechanisms. A brief description of an example of such mechanisms follows, and a detailed description appears in Section II, below.

The word that identifies the function, in this example, "order", may be discerned based on it being a good match against one of such a list of keywords associated with the domain "somedomain.tld" or which are elements of an ontology associated with the domain. In particular, webserver 108 may be configured with one or more keywords or ontologies that can be used to identify a particular function. That is, the keywords or ontologies associated with the domain may be identifiable based on a reference found on the website or associated with the domain name of the website. Thus, voice assistant back-end server 130 may contact webserver 108 between 352 and 353, in order to determine whether somedomain.tld associates the term "order" with a specific functionality. According to an embodiment, the keywords or ontologies associated with the domain may be provided by a third-party registry. For example, the keywords or ontologies associated with the domain may be provided as part of a manifest or lookup service. Voice assistant 110 or the voice-enabled webpage (that is, webserver 108) may accept synonyms and phrases that correspond with a configured keyword and discern based on this the configured keyword and function associated with the configured keyword. Voice assistant 110 or the voice-enabled webpage may use various word-matching techniques to identify alternative spellings for a received keyword and match against these alternatives. An artificial-intelligence-based framework on the voice-enabled webpage may discern the applicable function by interpreting the full utterance of the user. The voice-enabled webpage may receive the raw utterance passed by voice assistant 110 and perform natural language processing to identify the function. The function may be determined based on the identity of the application or device or the instigating application that initiated the request. State information relative to user 104 or an ongoing process may inform determination of the function. Context information associated with user 104, the locale, or entities associated with the user may inform determination of the function. The source of the request to the voice-enabled webpage and annotations on the request by the source may inform determination of the function. Voice assistant 110 or the voice-enabled webpage may interact with a back-end voice processing service to perform the functions identified above as being performed by a website. For example, the domain name of the website or other identifier associated with the website could inform the processing by the back-end service. However, the keyword spoken by the user does not have to match what is used in a URI to invoke the function identified by the keyword.

Figure 4:
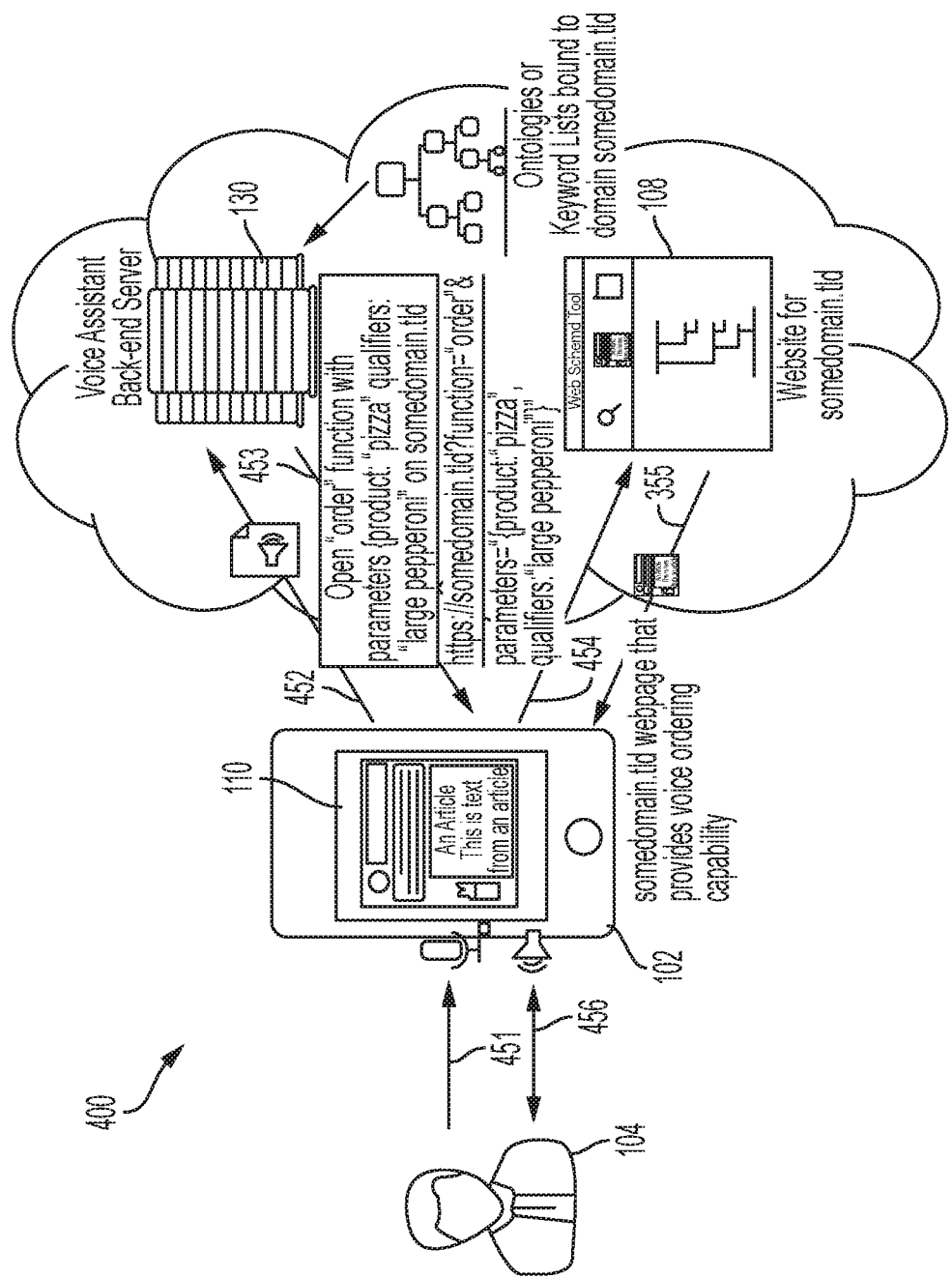
FIG. 4 is a schematic diagram of a system for passing parameters from a voice assistant to an invoked function on a voice-enabled webpage, according to various embodiments.

FIG. 4 is a schematic diagram of a system 400 for passing parameters from voice assistant 102 to an invoked function on a voice-enabled webpage, according to various embodiments. Like system 100 of FIG. 1, system 200 of FIG. 2, and system 300 of FIG. 3, system 400 of FIG. 4 includes user device 102, voice assistant 110, which is utilized by user 104, and voice assistant back-end server 130. Also, like systems 100, 200, and 300, system 400 includes webserver 108. Like system 300, webserver 108 of system 400 hosts a voice-enabled webpage. An example of the operation of system 400 where user 104 invokes an "order" function of the voice-enabled webpage of the website hosted by webserver 108 with parameter "pepperoni pizza" is described presently.

At 451, user 104 asks voice assistant 110 to "order a large pepperoni pizza from somedomain.tld". At 452, digital audio and/or text of the command is relayed to voice assistant back-end server 130. Voice assistant back-end server 130 converts the digital audio to text, if text was not conveyed to it, and performs natural language processing to determine that user wants to perform a "order" function (see FIG. 3 and associated description) against somedomain.tld and "large pepperoni pizza" comprises the order. Techniques by which voice assistant back-end server 130 makes this determination, including determining the appropriate parameters, are described below.

At 453, voice assistant back-end server 130 provides a response that directs user device 102 to open somedomain.tld in a browser and invoke the "order" function and provide the parameters of the order to the invocation {product: "pizza", qualifiers: "large pepperoni"}. Consequently, user device 102 invokes a browser to create a request, at 454, to somedomain.tld that invokes the "order" function with parameters {product: "pizza", qualifiers: "large pepperoni"}. On receiving the request, server-side code on webserver 108 determines by one of many possible mechanisms that the user made a voice request for the website and wants to place an order. At 455, webserver 108 returns appropriate voice-enabled webpage for allowing the user to perform a voice order. The voice-enabled webpage is displayed in the browser of user device 102 (or voice assistant 110, e.g., if a separate device). JavaScript in the order webpage, for example, processes the received parameters and identifies parameters, if any, of the pizza order that were missing or need to be verified and audibly prompts the user to resolve the items. (According to an embodiment, many types of processing could be performed on webserver 108 relative to the received request. For example, webserver 108 might only accept request that contain all required parameters and return an error message if parameters are missing. The webserver may also configure the JavaScript on the webpage with the parameters to be retrieved. Many mechanisms are possible and contemplated for splitting processing functions between server-side code and code executing in the browser.)

Techniques or embodiments by which voice assistant back-end server 130 may determine the appropriate function and parameters for the function are described in detail in Section II, below, and summarized presently. Words that identify parameter types or parameter values may be discerned by voice assistant back-end server 130 based on matching against one of a list of keywords associated with somedomain.tld (e.g., by contacting webserver 108) or which are elements of an ontology the applicable to the domain of the website. The keywords or ontologies associated with somedomain.tld may be identified as part of a manifest or lookup service. The keywords or ontologies associated with somedomain.tld may be identifiable based on a reference found on the website of the domain or associated with the domain name of the website. An ontology or list of keywords for somedomain.tld may be provided by webserver 108 or may be available from a service that associates the domain name of the website with applicable ontologies and/or lists of keywords. The website (e.g., webserver 108) may be configured with one or more keywords that can be used to identify a parameter type or parameter value. Webserver 108 may receive the raw utterance passed to it by voice assistant back-end server 130 as digital audio or as text derived from the audio and perform natural language processing to identify the parameter types and parameter values.

According to an embodiment, voice assistant back-end server 130 or webserver 108 may accept synonyms and phrases that correspond with configured parameter types and parameter values and discern, based on this, parameters for a function. Voice assistant back-end server 130 or webserver 108 may use various word-matching techniques to identify alternative spellings for a received parameter type or parameter value and match against these alternatives. An artificial-intelligence-based framework on voice assistant back-end server 130 or webserver 108 may discern the applicable parameter types and parameter values by interpreting the full utterance of the user.

The parameter types and parameter values may be determined based on the identity of the application or device or instigating application that initiated the request. State information relative to the user or an ongoing process may inform determination of the parameter types and parameter values. Context information associated with the user, the locale, or entities associated with the user may inform determination of parameters. The source of the request to the website and annotations on the request by the source may inform determination of parameters.

Voice assistant back-end server 130 or webserver 108 may interact with a back-end voice processing service to perform the functions identified above as being performed by voice assistant back-end server 130 or webserver 108. In this case, the domain name of the website or other identifier associated with the website may inform the processing by the back-end service.

These and other techniques by which system 400 may determine functions and parameters from a voice command by user 104 are presented in detail below in Section II.

II. Voice Enabled Webpages

This section described in detail voice-enabled webpages, including how they may be used to determine functions and parameters from a voice command. This section begins by presenting techniques for using a voice assistant to both a domain name, generating a website for a purchased domain name, and provisioning a purchased website for voice-enablement.

A. Acquiring, Configuring, and Provisioning Voice-Enabled Webpages

Figure 5:
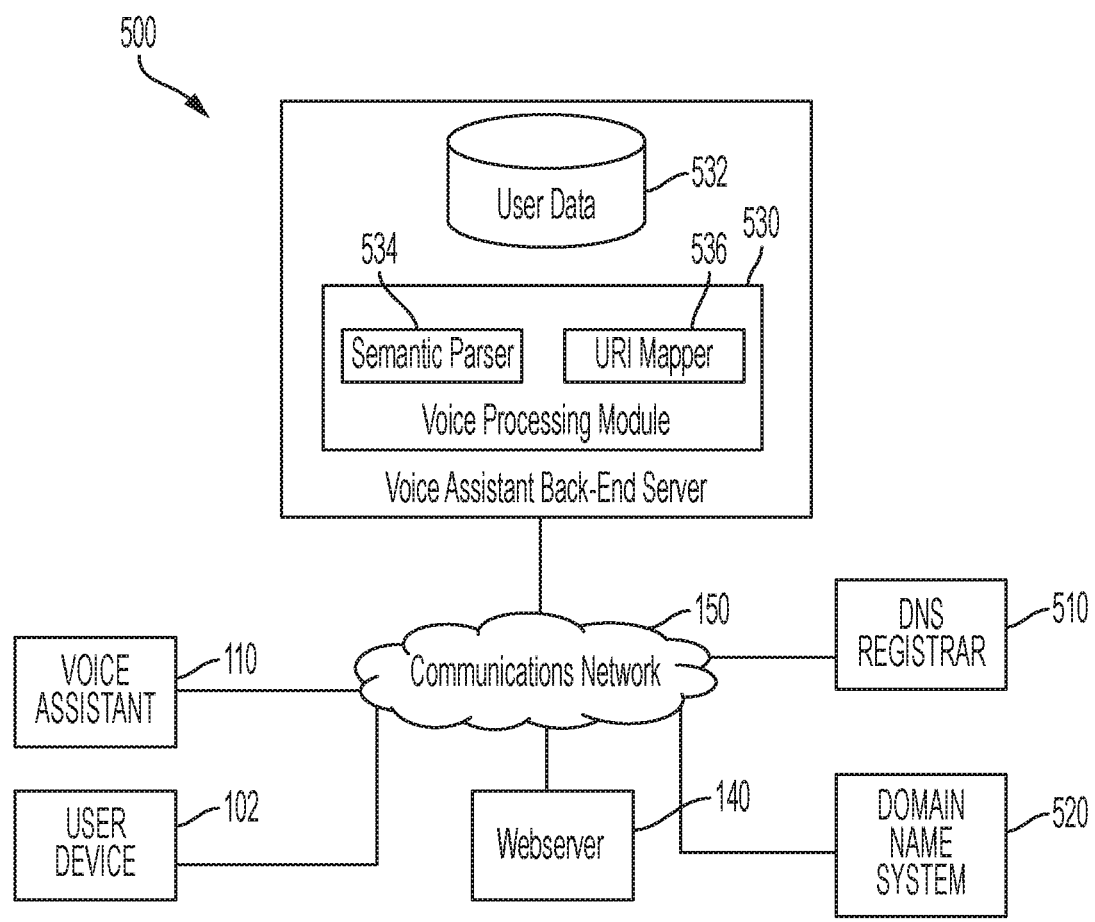
FIG. 5 is a schematic diagram of a system for purchasing a domain name using a voice assistant, according to various embodiments.

FIG. 5 is a schematic diagram of a system 500 for purchasing a domain name using voice assistant 110, according to various embodiments. System 500 includes voice assistant 110, which is included in, or coupled to, user device 102, voice assistant back-end server 130, communications network 150, webserver 140, domain name system (DNS) registrar 510, and DNS 520.

DNS 520 is part of the infrastructure of the World Wide Web that translates human-readable or human-understandable domain names into Internet Protocol (IP) addresses uses to establish TCP/IP communication over the internet. Domain name system 520 receives a domain name, such as "test.tld," and returns the corresponding IP address for the domain name, such as 192.7.1.72. DNS 520 includes a domain name registry that provides a master database of answers to queries for IP addresses associated with domain names. In some embodiments, DNS registrar 510 may add to the domain name registry a DNS entry that binds a specific domain name to a voice-enabled webpage stored in webserver 140. In some embodiments, voice assistant back-end server 130 may request that DNS 520 modify the domain name registry to redirect requests for a domain name to the domain of the voice-enabled webpage.

In operation, a user of system 500 may issue one or more natural language requests to first determine whether a specified domain name is available for purchase, and then purchase the domain name and bind the domain name to a particular IP address for a specified website. In some embodiments, the specified website may be a voice-enabled webpage stored in webserver 140. During subsequent operations, one or more users may access the voice-enabled webpage stored in webserver 140 using either the domain or an IP address as stored in DNS 520.

DNS registrar 510 interfaces with domain name registries within DNS 520 for one or more top-level domains. DNS registrar 510 is accredited by a top-level domain registry and provides domain name registration services. DNS 520 responds to queries for domain names by providing IP addresses associated with the domain names. In some embodiments, DNS registrar 510 may register internet domain names for the user. For example, the user may generate a natural language request via voice assistant 110, which requests that DNS registrar 510 determine whether a domain name is already owned. DNS registrar 510 may refer to DNS 520 to determine whether an entry for the requested to domain exists. In some embodiments, when an entry for the domain name does not exist, DNS registrar 510 may enable the user to purchase the requested domain name.

In some embodiments, voice processing module 530 of voice assistant back-end server 130 may generate one or more related domain names to the domain name specified in the natural language request. For example, the natural language request may be associated with a domain name "test.tld." Voice processing module 530 may then generate related domain names, such as domain names in other domains (e.g., "test.org"), sound-alike domain names (e.g., "best.tld", "pest.tld", "tess.tld"), or other domain names that are similar to the specified domain name (e.g., "te-st.tld", "testing.tld", "exam.tld", "quizzes.tld"). In such embodiments, voice assistant back-end server 130 may generate separate requests to DNS registrar 510 for each related domain name and, upon determining that the related domain name is available for purchase, allows the user to purchase the related domain name.

Voice assistant back-end server 130 of system 500 further includes voice processing module 530 and user data 532. User data 532 stores information associated with one or more users of voice assistant 110. User information may include, for example, an identifier for the user, a set of domains and/or domain names owned by the user, stored passwords associated with the user, a voice profile of the user, a history of natural language requests made by the user, a history of responses provided to the user, and/or configuration information set by the user or generated by voice assistant back-end server 130. In some embodiments, the user may set user information using a different interface, such as a text-based interface provided by voice assistant back-end server 130. In some embodiments, user data 532 may also include information associated with one or more websites stored by webserver 140. For example, user data 532 may store each website that user has authorization to access and/or modify. In some embodiments, user data 532 may store redirection instructions for one or more domain names. For example, when webserver 140 stores both a voice-enabled webpage and an associated non-voice enabled webpage, voice assistant back-end server 130 may store in user data 532 redirection instructions to retrieve the voice-enabled webpage in response to requests for the non-voice-enabled webpage.

Voice processing module 530 may include semantic parser 534 and URI mapper 536. Voice processing module 530 may receive audio captured by voice assistant 110 and performs speech recognition operations on the audio to identify a request spoken by the user. In some embodiments, voice processing module 530 includes semantic parser 534 to identify known keywords, generate phonetic spellings, and/or identify syntax included in a natural language request. In some embodiments, voice processing module 530 includes URI mapper 536 to map natural language requests identified as domain names to a specific universal resource identifier location specified by DNS 520. When processing an incoming natural language request, voice processing module 530 may identify one or more webservers 130 targeted by the natural language request.

Semantic parser 534 may generates one or more keywords and/or key phrases from the natural language request received from voice assistant 110. In some embodiments, semantic parser 534 may compare the string of words to known syntax to identify specified actions or websites. In some embodiments, semantic parser 534 may generate a phonetic spelling of a domain name. For example, an input natural language request of "is test dot com owned by anybody?" may be received by semantic parser 534. In some embodiments, semantic parser 534 may determine each word in the phrase and may compare phrases to stored syntax for queries and/or stored syntax for websites. Semantic parser 534 may match one or more words of the clause "owned by anybody" to an operation to send a request to DNS registrar 510 to determine whether an entry for the domain name for "test.tld" already exists in the domain name registry of DNS 520. Similarly, the phrase "add to test.tld" may cause semantic parser identify the keyword "add" as a operational command, or function, by voice assistant back-end server 130 to request a modification to a specific website stored in webserver 140.

URI mapper 536 may generate a webserver request as a uniform resource identifier (URI) based on the natural language request by the user. In some embodiments, voice processing module 530 may identify a URI in the natural language request based on one or more key phrase that matches a specified syntax. For example, URI mapper 536 may identify a string of words, such as "test dot com" and match portions of the key phrase to a known syntax, generating a webserver request that includes the term "test.tld." In some embodiments, URI mapper 536 may generate a URI based on one or more keywords identified in the natural language request. For example, URI mapper 536 may receive the term "test" from semantic parser 534 and may generate one or more URIs using the term as a base word, generating URIs such as "test.tld", "test.org", "t-e-s-t.tld", and similar URIs. In some embodiments, URI mapper 536 may refer to information stored in user data 534 to determine which URI to include when generating the webserver request. URI mapper 536 may transmit the webserver request to webserver 140, based on the URI generated, for the corresponding URI syntax applicable to the webpage stored in webserver 140.

Upon receiving the applicable webpage from webserver 140, voice assistant back-end server 130 may generate a response that includes at least a portion of the webpage. In some embodiments, voice assistant back-end server 130 may generate a response indicating that voice assistant back-end server 130 successfully retrieved the webpage specified as stored in webserver 140. In some embodiments, upon sending the response indicating a successful retrieval, voice assistant back-end server 130 may wait for additional natural language requests from the user. For example, a user may successively purchase one or more related domain names. After each purchase, voice assistant back-end server 130 may generate a DNS request that is sent to DNS registrar 510 and DNS 520. Once the domain name is bound to the domain of the specified website, voice assistant back-end server 130 may generate a webserver request for the specified webpage and, upon receipt of the webserver response that includes the specified webpage, voice assistant back-end server 130 may generate and transmit a response to voice assistant 110 indicating that the purchase of the domain name and generation of a website for the requested domain name was successful.

Figure 6:
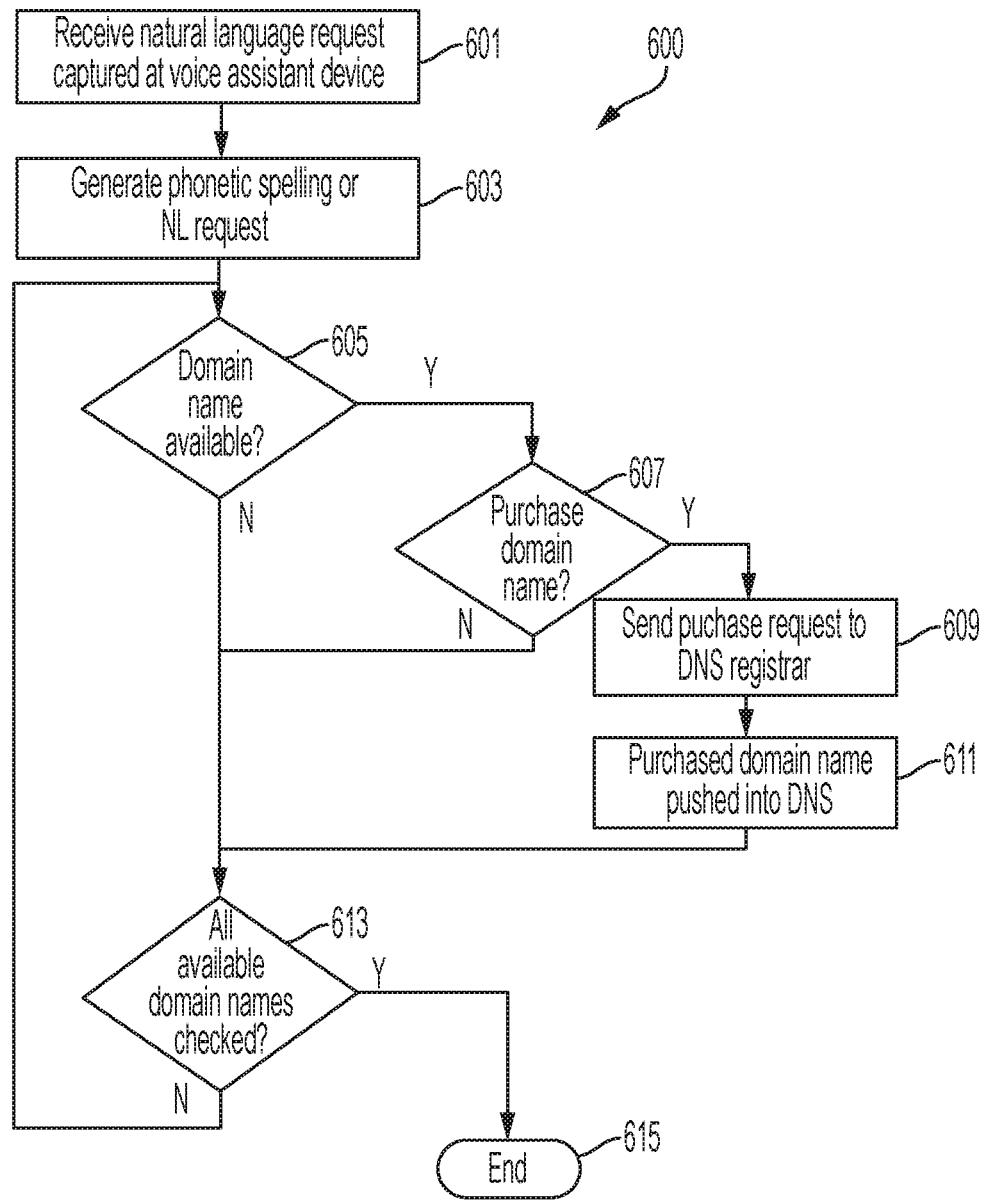
FIG. 6 is a flow diagram for a method of purchasing a domain name based on a user request made to a voice assistant, according to various embodiments.

FIG. 6 is a flow diagram for a method 600 of purchasing a domain name based on a user request made to a voice assistant, according to various embodiments. Method 600 may be practiced using system 500 of FIG. 5, for example.

Method 600 may begin at step 601, where voice processing module 530 receives a natural language request captured at voice assistant 110. Voice assistant 110 may capture the natural language request via one or more microphones included in voice assistant 110 or connected to voice assistant 110. The natural language request specifies information to be retrieved or an action to be performed. In some embodiments, the action may include one or more of a query about the status of a specified website, a query to purchase a domain name, or a command to purchase one or more domain names related to the specified domain name.

At step 603, voice processing module 530 generates a phonetic spelling of the natural language request. In some embodiments, semantic parser 534 included in voice processing module 530 may identify one or more words in the natural language request. In some embodiments, voice processing module 530 may generate related words associated with one or more words in the natural language request. In some embodiments, semantic parser 534 may identify portions of one or more words and may generate a new word based on combining the identified portions. After identifying the word and set of related words, semantic parser 534 and/or URI mapper 536 may generate one or more domain names for each of the words in the set.

At step 605, voice processing module 530 may generate a request to determine whether a specified domain name is available for purchase. For example, voice processing module 530 may use URI mapper 536 to generate a request for a specified domain name to determine whether an entry in the DNS registry already exists for the specified domain name. If voice assistant back-end server 130 receives a response indicating that an entry already exists for the specified domain name, voice assistant back-end server 130 proceeds to step 613, where voice assistant back-end server 130 checks to determine whether to generate a request for any remaining domain names from the set generated at step 603. If voice assistant back-end server 130 receives a response indicating that no entry exists for the specified domain name, then voice assistant back-end server 130 proceeds to step 607.

At step 607, voice assistant back-end server 130 generates a response to voice assistant 110 indicating that the specified domain name is available for purchase. Voice assistant back-end server 130 may then wait for a subsequent natural language request from the user via voice assistant 110 indicating whether to purchase the specified domain name. If voice assistant back-end server 130 receives a natural language request indicating that the specified domain name should be purchased, then voice assistant back-end server 130 proceeds to step 609. If voice assistant back-end server 130 receives a natural language request indicating that the specified domain name should not be purchased, then voice assistant back-end server 130 proceeds to step 613.

At step 609, voice assistant back-end server 130 may send a request to DNS registrar 510. The request may include information required to purchase the specified domain name. In some embodiments, voice assistant back-end server 130 may retrieve user information from user data 532 and include the user information in the request to enable DNS registrar 510 to authorize the purchase of the specified domain name. In some embodiments, voice assistant back-end server 130 may group multiple domain names together and send a single request that each of the included domain names to be purchased by the user.

At step 311, voice assistant back-end server 130 may cause the purchased domain name to be pushed into DNS 520. In some embodiments, DNS registrar 510 may generate a DNS registry request to DNS 520 to add a DNS entry to the DNS registry to include the specified domain name. In some embodiments, voice assistant back-end server 130 may generate and transmit a request to DNS 520, where the request is to add a DNS entry to the DNS registry to include the specified domain name. Once a DNS entry is added to the DNS registry for the specified domain name, voice assistant back-end server 130 may proceed to step 613.

At step 613, voice assistant back-end server 130 checks to determine whether to generate request for any remaining domain names from the set generated at step 603. If one or more domain names in the set remain, then voice assistant back-end server 130 may return to step 605, where the voice assistant back-end server 130 generates request for a new domain name. Otherwise, if no domain names in the set remain, voice assistant back-end server 130 may end method 600 at step 615.

Figure 7:
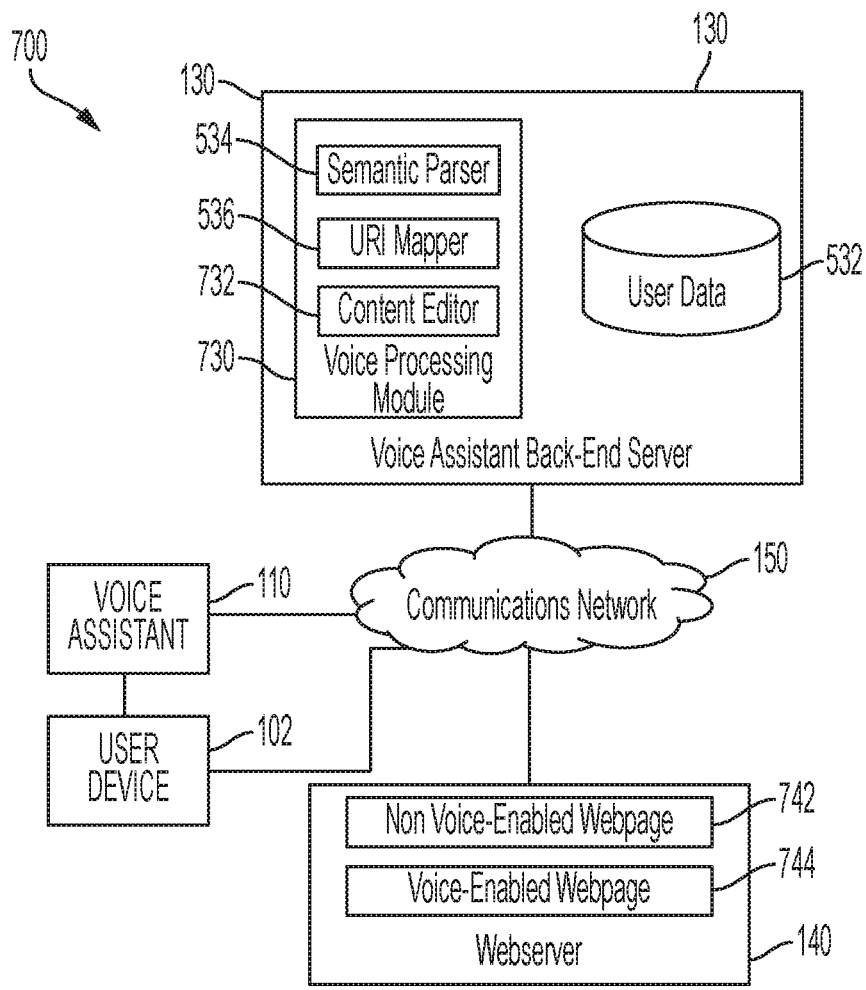
FIG. 7 is a schematic diagram of a system for generating a voice-enabled webpage using a voice assistant, according to various embodiments.

FIG. 7 is a schematic diagram of a system 700 for generating a voice-enabled webpage using voice assistant 110, according to various embodiments. System 700 may include voice assistant back-end server 130, communications network 150, webserver 140, and voice assistant 110, which may be included in, or coupled to, user device 102.

Voice assistant back-end server 130 may include voice processing module 730 and user data 532. Voice processing module 730 may include semantic parser 534, URI mapper 536, and content editor 732. Webserver 140 hosts non-voice-enabled webpage 742 and/or voice-enabled webpage 744. In operation, a user may add and/or edit voice-enabled webpage 744 via voice assistant back-end server 130 by generating key-value pairs and including the key-value pairs in a specified portion within voice-enabled webpage 744. The key-value pairs associate keywords, functions, parameters, etc. to values such as URIs. The key-value pairs may take the form of electronically stored ordered pairs (or n-tuples for n>2) of the form (keyword, value). The "value" may be a URI.

According to an embodiment, more than two data items may be stored in a key-value pair. That is, as used herein, the term "key-value pair" means any electronically stored n-tuple of data, with n>1, that includes at least a keyword (or term) and an associated endpoint, such as a URI or IP address.

Voice processing module 730 of voice assistant back-end server 130 may include semantic parser 534, URI mapper 536, and content editor 732. Content editor 732, which may be, for example, voice-based, text-based, cloud-based, and/or part of voice assistant 110, may generate key-value pairs and generates requests including key-value pairs for inclusion in voice-enabled webpage 744. In some embodiments, voice processing module 730 may receive one or more natural language requests that include information for a key-value pair. Content editor 332 may generate the key-value pair by linking or otherwise associating a unique identifier, e.g., a keyword, to a specified value, e.g., a URI.

In some embodiments, content editor 732 may generate multiple key-value pairs for a single value. For example, content editor 732 may identify an initial target keyword or key phrase as the initial unique identifier. Content editor 732 may generate a set of related keywords or key phrases based on the initial target keyword or key phrase. For example, content editor 732 may identify an initial keyword of "menu" and, based on the initial keyword, generate a set of related keywords. In some embodiments, the set of related keywords may be synonyms to the initial keyword (e.g., "list," "list of options", "set of choices", etc.) and/or sound-alike words ("venue", "review", "men-you", etc.). In some embodiments, content editor 732 may, in addition to generating a key-value pair for the initial keyword and the initial linked value, generate additional key-value pairs for each of the related keywords. In such instances, each of the related keywords may be linked to a value that is a pointer that points to the initial key-value pair. In some embodiments, each of the related keywords may be linked to copies of the initial linked value.

Upon generating the one or more key-value pairs, content editor 732 may send a request to webserver 140 to store the key-value pairs in voice-enabled webpage 744. In some embodiments, the key-value pair included in the request may overwrite a key-value pair already stored in voice-enabled webpage 744. In some embodiments, webserver 140 may initially determine whether the user has authorization to create and/or modify voice-enabled webpage 744. When webserver 140 determines that the user has authorization to create and/or modify voice-enabled webpage 744, webserver 140 may update voice-enabled webpage 744 with the key-value pairs included in the request.

Non-voice-enabled webpage 742 may be a webpage that does not include only information for processing by voice assistant 110 and/or voice assistant back-end server 130. In some embodiments, non-voice-enabled webpage 742 includes contents for viewing, including video and images.

Voice-enabled webpage 744 may be a webpage that includes information designed for processing by voice assistant 110 and/or voice assistant back-end server 130. In some embodiments, Voice-enabled webpage 744 may include solely information that can be processed by voice assistant 110 and/or voice assistant back-end server 130. For example, Voice-enabled webpage 744 may include a key-value pair database that stores each key-value pair as a separate entry. Voice assistant back-end server 130 may search the contents of the key-value pair database by sending a request to webserver 140 storing voice-enabled webpage 744, where the webserver request includes a specific keyword or key phrase as a target unique identifier to be found in the key-value pair database. When a user subsequently attempts to access information from voice-enabled webpage 744, voice assistant back-end server 130 may generate a request with a keyword or key phrase as the target unique identifier. Webserver 140 may retrieve the linked value from a key-value pair including the target keyword or key phrase. Voice assistant back-end server 130 may then generate a response that includes the linked value and transmit the generated response to voice assistant 110.

Figure 8:
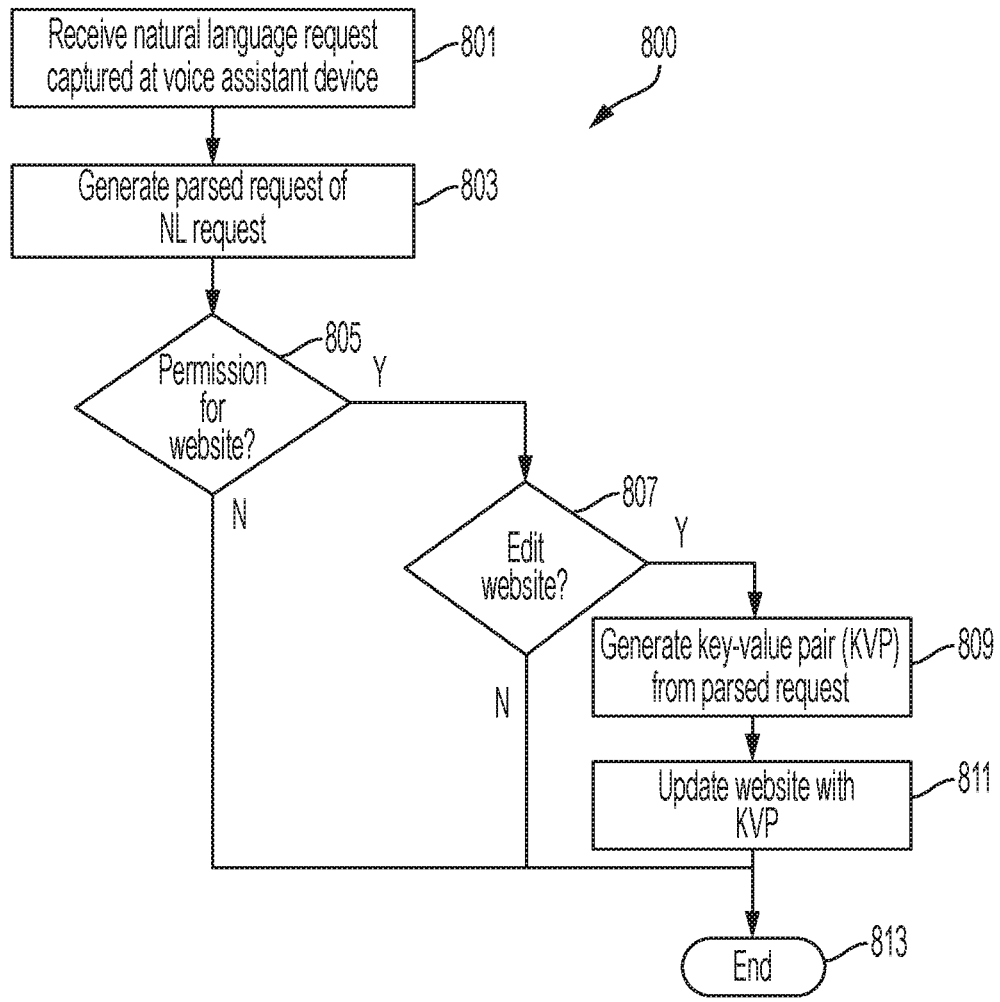
FIG. 8 is a flow diagram for a method of using a voice assistant to provision a voice-enabled webpage with key-value pairs, according to various embodiments.

FIG. 8 is a flow diagram for a method of using a voice assistant to provision a voice-enabled webpage with key-value pairs, according to various embodiments. Method 800 may be practiced using system 700 of FIG. 7, for example.

Method 800 begins at step 801, where voice assistant back-end server 130 receives a natural language request captured at voice assistant 110. In some embodiments, voice assistant back-end server 130 may implement voice processing module 730 to perform voice recognition techniques on the incoming natural language request. In some embodiments, voice assistant back-end server 130 may receive one or more natural language requests in succession in relation to a request to modify the contents of a specific webpage. For example, voice assistant back-end server 130 may receive a first natural language request specifying a voice-enabled webpage 744 that is to be modified. Voice assistant back-end server 130 may then receive a subsequent request that indicates the keyword or key phrase that should be included in a key-value pair as a unique identifier. Voice assistant back-end server 130 may then receive a subsequent request that indicates the linked value to be associated with the unique identifier.

At step 803, voice assistant back-end server 130 generates a parsed request from the natural language request. In some embodiments, voice assistant back-end server 130 may generate one or more requests from the natural language request. For example, voice processing module 730 may use semantic parser 534 and/or URI mapper 536 to generate a DNS request to identify an IP address of voice-enabled webpage 744 bound to a domain specified in the natural language request. Voice processing module 730 may then generate a request that requests permission to edit the website identified in the DNS entry associated with the specified domain name.

At step 805, voice assistant back-end server 130 determines whether the user has permission to modify the website. In some embodiments, voice assistant back-end server 130 may retrieve user information from user data 532 to determine whether the user has permission to modify the voice-enabled webpage 734 identified in the natural language request. In some embodiments, voice assistant back-end server 130 generates and transmits the request to webserver 140 to request permission to modify voice-enabled webpage 734 stored in webserver 140. In some embodiments, voice assistant back-end server 130 may request additional information from the user to enable voice assistant back-end server 130 to determine that the user has permission to modify voice-enabled webpage 734. If voice assistant back-end server 130 determines that the user does not have permission to modify voice-enabled webpage 734, then method 800 may end at step 813. If voice assistant back-end server 130 determines that the user has permission to modify voice-enabled webpage 734, then voice assistant back-end server 130 may proceed to step 807.

At step 807, voice assistant back-end server 130 determines whether the natural language request includes a command to modify the website. In some embodiments, voice assistant back-end server 130 may wait for a subsequent natural language request after determining that the user has permission to modify voice-enabled webpage 734. In some embodiments, voice processing module 730 may parse the natural language request to determine whether the natural language request includes a command to modify voice-enabled webpage 734. If voice assistant back-end server 130 determines that the natural language request does not include a command to modify voice-enabled webpage 734, voice assistant back-end server 130 may end method 800 at step 813. If voice assistant back-end server 130 determines that the natural language request includes a command to modify voice-enabled webpage 734, then voice assistant back-end server may proceed to step 809.

At step 809, voice assistant back-end server 130 may generate a key-value pair from the parsed request. In some embodiments, content editor 332 may identify one or more keywords, key phrases, and/or values included in the natural language request. In some embodiments, voice assistant back-end server 130 may receive multiple natural language requests and use parsed words from the multiple natural language requests to generate the key-value pair. Content editor 732 may generate a key-value pair that includes the keyword or key phrase as a unique identifier and the value as the linked value. In some embodiments, content editor 732 may generate a key-value pair that includes a pointer as the linked value. In such instances, accessing the value from the key-value pair results in webserver 140 returning a referral key-value pair or referral value.

In some embodiments, content editor 732 may generate a set of key-value pairs related to the initial key-value pair. For example, content editor 732 may identify an initial keyword of "menu" and, based on the initial keyword, generate a set of related keywords. In some embodiments, the set of related keywords may be synonyms to the initial keyword (e.g., "list," "list of options", "set of choices", etc.) and/or sound-alike words ("venue", "review", "men-you", etc.). In some embodiments, content editor 732 may, in addition to generating a key-value pair for the initial keyword and the initial linked value, generate additional key-value pairs for each of the related keywords. In such instances, each of the related keywords may be linked to a value that is a pointer that points to the initial key-value pair. In some embodiments, each of the related keywords may be linked to copies of the initial linked value.

At step 811, voice assistant back-end server 130 updates voice-enabled webpage 734 with the one or more generated key-value pairs. In some embodiments, content editor 732 may send a request to webserver 140 to store the key-value pairs in voice-enabled webpage 734. In some embodiments, the key-value pair included in the request may overwrite a key-value pair already stored in website 342, 344. In some embodiments, webserver 140 may initially determine whether the user has authorization to create and/or modify voice-enabled webpage 734. Webserver 140 may update voice-enabled webpage 734 with the key-value pairs included in the request. After updating voice-enabled webpage 734 with the key-value pairs, method 800 may ends at step 813.

Accordingly, some embodiments of method 800 may provide a technique to generate contents of webpages tailored to the unique configuration of voice assistants. By generating webpage contents as key-value pairs that use natural language phrases as unique identifiers, voice assistants may easily access information in a manner intended by the webpage designer. Further, generating multiple key-value pairs from a single natural language input enables a webpage to include applicable responses to a wide range of natural language inputs, which allows users to receive responses to natural language inputs without requiring a high level of precision by the user when making a natural language input to the voice assistant. As a result, the voice-enabled webpages are a useful source of information for users when accessing the internet via a voice assistant.

Figure 9:
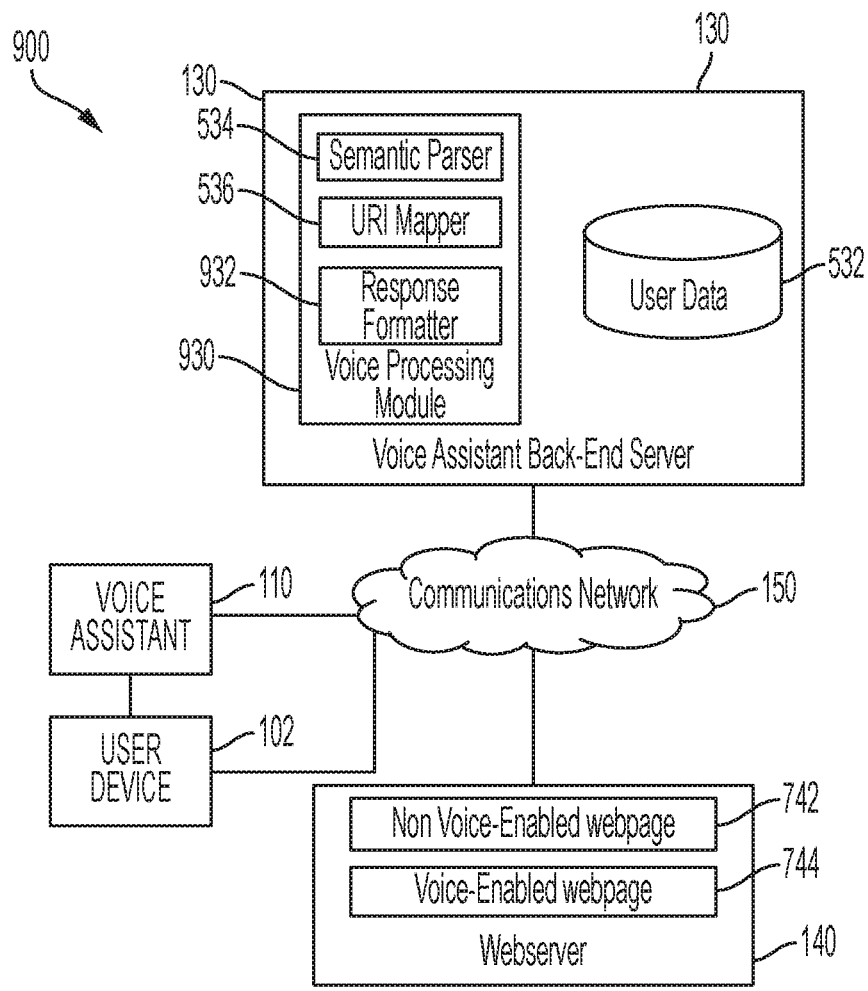
FIG. 9 is a schematic diagram of a system for interacting with a voice-enabled webpage using a voice assistant, according to various embodiments.

FIG. 9 is a schematic diagram of a system 900 for interacting with a voice-enabled webpage using voice assistant 110, according to various embodiments. System 900 may include voice assistant back-end server 130, communications network 150, webserver 140, and voice assistant 110, which is included in, or coupled to, user device 102. Voice assistant back-end server 130 may include voice processing module 930 and user data 532. Voice processing module 930 may include semantic parser 534, URI mapper 536, and response formatter 932. Webserver 140 may host non-voice-enabled webpage 742 and voice-enabled webpage 744.

In operation, voice assistant back-end server 130 may retrieve information from a website in response to one or more natural language requests made by the user via voice assistant 110. Voice assistant back-end server 130 may then generate a response that includes the retrieved information and transmit the response to voice assistant 110.

Alternately, voice assistant back-end server 130 may provide a link and/or other information to voice assistant 110 and/or user device 102 so that assistant 110 and/or user device 102 may retrieve information from a website in response to one or more natural language requests made by the user via voice assistant 110.

Thus, voice processing module 930 receives a natural language request to retrieve information from voice-enabled webpage 744. Voice assistant back-end server 130 may use semantic parser 534 and URI mapper 536 to identify and access the website specified in the natural language request. In some embodiments, the natural language request may not identify a specific website that includes the information. In such instances, voice assistant back-end server 130 may generate a web query that includes information from the natural language request to find the voice-enabled webpage 744 that includes the most applicable information.

Response formatter 932 receives webserver responses or response values from information included in voice-enabled webpage 744 that is hosted by webserver 140. Once voice assistant back-end server 130 identifies the applicable voice-enabled webpage 744, response formatter 932 may generate a request that includes one or more keywords and/or key phrases. In some embodiments, response formatter 932 generates a request based on the data being requested. The request may be formatted as a uniform resource identifier (URI), uniform resource locator (URL), or some other applicable format based on the communication protocol implemented for interacting with webserver 140. Webserver 140 may provide response formatter 932 with a response based on the request. Webserver 140 may use the included keywords and/or key phrases included in the request to identify a key-value pair stored in voice-enabled webpage 744 that has the keyword or key phrase as a unique identifier. Webserver 140 may generate a response that includes the linked value included in the key-value pair that included the keyword or key phrase as the unique identifier.

Response formatter 932 may generate a response based on the response and transmit the response to voice assistant 110. In some embodiments, the response generated by response formatter 932 may include digital audio and/or syntax based on the values included in the webserver response. For example, when the webserver response includes multiple items in a list, response formatter 632 may generate digital audio dictating each item, adding a pause between each item. The added pauses may indicate to the user the separation between each item in the list.

Figure 10:
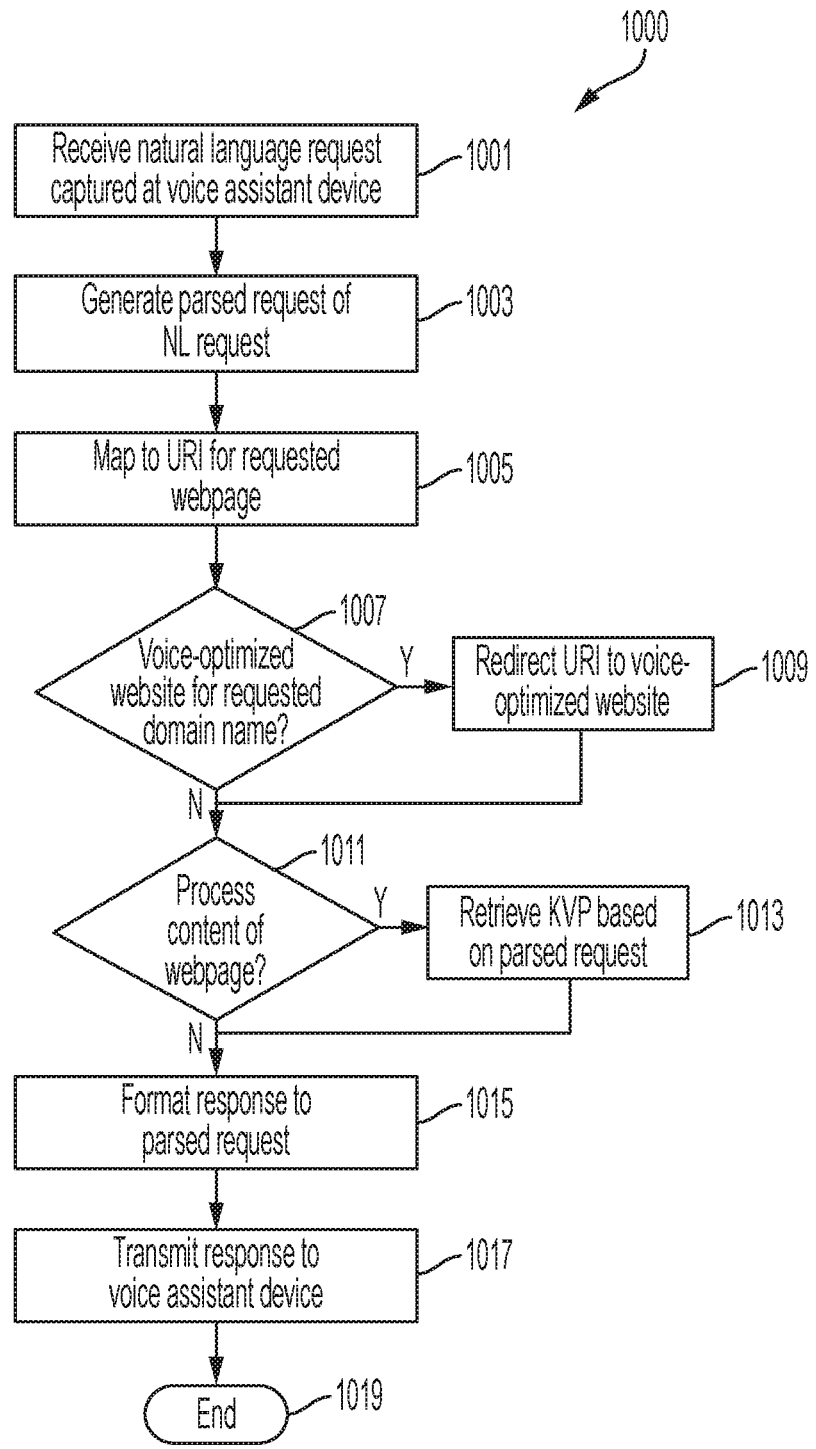
FIG. 10 is a flow diagram for a method of interacting with a voice-enabled webpage, according to various embodiments.

FIG. 10 is a flow diagram for a method 1000 of interacting with a voice-enabled webpage, according to various embodiments. Method 1000 may be practiced using system 900 of FIG. 9, for example.

Method 1000 begins at step 1001, where voice assistant back-end server 130 receives a natural language request captured at voice assistant 110. In some embodiments, voice assistant back-end server 130 may implement voice processing module 930 to perform voice recognition techniques on the incoming natural language request. In some embodiments, voice assistant back-end server 130 may receive one or more natural language requests in succession in relation to a request to retrieve specified contents of a specific webpage. For example, voice assistant back-end server 130 may receive a first natural language requesting access to a specific voice-enabled webpage 744. Voice assistant backend server 130 may then receive a subsequent request that indicates the keyword or key phrase to search for within the specific voice-enabled webpage 744.

At step 1003, voice assistant back-end server 130 generates a parsed request from the natural language request. Voice processing module 930 may use semantic parser 534 to identify a parsed request from the natural language request. In some embodiments, semantic parser 534 may generate a phonetic spelling of a domain name. For example, an input natural language request of "go to sports today dot com and tell me the NFL scores" may be received by semantic parser 534. In some embodiments, semantic parser 534 may determine each word in the phrase and may compare phrases to stored syntax for queries and/or stored syntax for websites. Semantic parser 534 may match one or more words of the clause "go to sportstoday.tld" to an operation to send a request to DNS 220 to retrieve an IP address bound to the for the domain name for "sportstoday.tld" from the DNS registry. Similarly, the phrase "tell me the NFL scores" may cause semantic parser identify the keyword "tell me" as a operational command by voice assistant back-end server 130 to request information from a "sportstoday.tld" voice-enabled webpage hosted by webserver 140.

At step 1005, voice assistant back-end server 130 may use URI mapper 536 to generate a request to DNS 220 to identify a domain of voice-enabled webpage (e.g., voice-enabled webpage 744) bound to a domain specified in the natural language request. URI mapper 536 may generate a request to DNS 220 to retrieve a domain bound to the for the domain name for "sportstoday.tld" the DNS registry. In some embodiments, voice assistant back-end server 130 may generate additional requests for synonyms, sound-alike domains, or related domain names. In such instances, URI mapper 536 may also generate requests for each of the related domain names. When multiple domain names contain entries in the DNS registry, voice assistant back-end server 130 may use response formatter 932 to generate a warning to inform the user that multiple websites were found. The warning may also indicate that the additional websites may be a part of a phishing attack. In such instances, the user may select a specific domain name from the list of related domain names. In some embodiments, a specific domain name may be chosen based on previous decisions made by a plurality of other users. In some embodiments, voice assistant back-end server 130 may store the user's selection as part of user data 532.

At step 1007, voice assistant back-end server 130 (or the DNS) may determine whether a voice-enabled webpage for the requested domain name exists. In some embodiments, webserver 140 may store multiple websites for the same domain name. In such instances, voice assistant back-end server 130 and/or the DNS may identify the natural language request as a request originating at voice assistant 110 and redirect access to the domain name from non-voice-enabled webpage 742 to voice-enabled webpage 744. When voice-enabled webpage 744 for the requested domain exists, voice assistant back-end server 130 may proceed to step 1009, where voice assistant back-end server 130 generates a request to access voice-enabled webpage 744. Otherwise, when voice-enabled webpage 744 does not exist, voice assistant back-end server 130 may proceed to step 1011 after generating a request to access non-voice-enabled webpage 742.

At step 1011, voice assistant back-end server 130 may determine whether the natural language request includes a specific command to process the contents of the requested voice-enabled webpage 744. In some instances, the natural language request includes a request for specific information (e.g., "tell me the NFL scores"). In other instances, the natural language request only includes a command to access the requested webpage (e.g., "take me to sportstoday.tld"). If voice assistant back-end server 130 determines that the natural language request includes a command or operation to process contents of the requested webpage, voice assistant back-end server 130 proceeds to step 1013. Otherwise, voice assistant back-end server 130 proceeds to step 1015.

At step 1013, voice assistant back-end server 130 retrieves a key-value pair based on the parsed request. Voice assistant back-end server 130 may generate a webserver request that includes the one or more keywords and/or key phrases identified by semantic parser 234. Voice assistant back-end server 130 sends the webserver request to webserver 140, which uses the included keywords and/or key phrases to identify a key-value pair that includes one of the keywords and/or key phrases as a unique identifier. Webserver 140 may identify a key-value pair that includes the unique identifier any may retrieve the linked value from the identified key-value pair. In some embodiments, the linked value may be a pointer to a different key-value pair. In such instances, webserver 140 may iteratively retrieve key-value pairs until webserver 140 retrieves a key-value pair that only contains a value (i.e., no pointer). Webserver 140 may then generate and transmit a webserver response that includes the linked value from the retrieved key-value pair.

At step 1015, voice assistant back-end server 130 may use response formatter 932 to format a response to the parsed request. Response formatter 932 may receive a response from webserver 140 that includes the linked value from the retrieved key-value pair. In some embodiments, response formatter 932 may generate a response that may include digital audio and/or syntax based on the values included in the webserver response. For example, when the webserver response includes multiple items in a list, response formatter 932 may generate digital audio dictating each item, adding a pause between each item. The added pauses may indicate to the user the separation between each item in the list.

At step 1017, response formatter 932 transmits the response to voice assistant 110. In some embodiments, the response may include indications that voice assistant back-end server 130 successfully accessed the requested voice-enabled webpage 744. In some embodiments, the response may only include information related to the linked value received from webserver 140. Once voice assistant back-end server 130 transmits the response to voice assistant 110, method 1000 ends at step 1019.

In sum, a voice processing module in the digital assistant back-end service may receive a user request for specified contents of a webpage from a user. The voice processing module may process the user request to identify a key phrase included in the user request. A response formatter included in the voice processing module may use the identified key phrase to identify a key-value pair included in the voice-enabled webpage that includes the key phrase as a unique identifier and retrieves the associated linked value included in the applicable key-value pair. The response formatter may then provide the linked value to the voice assistant.

B. Configuring and Using Key-Value Pairs

In general, FIGS. 11-14 illustrate techniques for storing keywords (and/or key phrases) in association with values (e.g., URIs or IP addresses), that is, key-value pairs, at various locations. FIGS. 11-14 detail storing such information at registries, registrars, service providers, the DNS, and at webservers. In more detail, such information may be stored at the registry with EPP, at the registrar or service provider with a 4-tuple <domain, text keyword, phonetic keyword, endpoint that processes the keyword>, at the DNS with DNS TXT records, or directly at a domain in HTML code or at a webserver host endpoint. Retrieval of this information can rely on well-established practices, for example: API or EPP if using registry, API if interacting with a registrar or service provider, fetching DNS TXT records if using DNS, and standard operations at websites, e.g. reading meta tags or querying endpoints.

According to an embodiment, the key-value pairs may accommodate phonetic representations. Thus, a "key-value pair" may include a keyword, a value such as a URI or IP address, and a phonetic representation of the keyword. For example, an ordered tuple may be a "key-value pair" if it at least includes and associates a keyword to a value. A "key-value pair" may include additional data, such as phonetic representations. Such key-value pairs may be used for a voice-enabled webpage. Such voice-enabled webpages may be processed by, or interact with, voice assistants to increase the functionality and value of domain names in several ways:

Voice-enabled webpages may use associated pronunciations to resolve potential ambiguities from a user's vocal input, e.g. if a voice assistant back-end server identifies multiple candidate operations that would match a user's vocal input, it could use the keyword's phonetic information to differentiate between the multiple selections.

According to various embodiments, keywords' phonetic pronunciations may be created using a standardized text-to-phonetic converter, e.g. International Phonetic Alphabet (IPA), which ensures that all such conversions have a standardized backing to avoid confusion. Such embodiments may use, for example, either or both of the following two workflows to create the phonetic information for each supported voice-based operation: A user may use an application to establish the phonetic pronunciation(s) of their supported voice-based operation and store that for future use. Alternately, or in addition, a service may take a keyword and converts it to a set of phonetic pronunciations that a user may use to identify appropriate phonetic matches. These matches may then be added to the system managing the keywords. Either approach ensures correctness for interacting reliably with voice-based platforms. As users may not, in general, be well-versed in phonetics, a tool may be supported to simplify the conversion between keyword and its potential phonetic representations, e.g. take a keyword operation and convert to possible pronunciations, then let a user hear the pronunciations and select the appropriate phonetic matches. This tool may be provided directly as a service by a DNS registry for the domain names of the voice-enabled webpages, or may be left as a service to implement by each registrar.

Thus, FIGS. 11-14 detail the above embodiments using the example of a registrant adding support in their voice-enabled webpage for, e.g., a "calendar" keyword, which points to some calendar-based operation.

Figure 11:
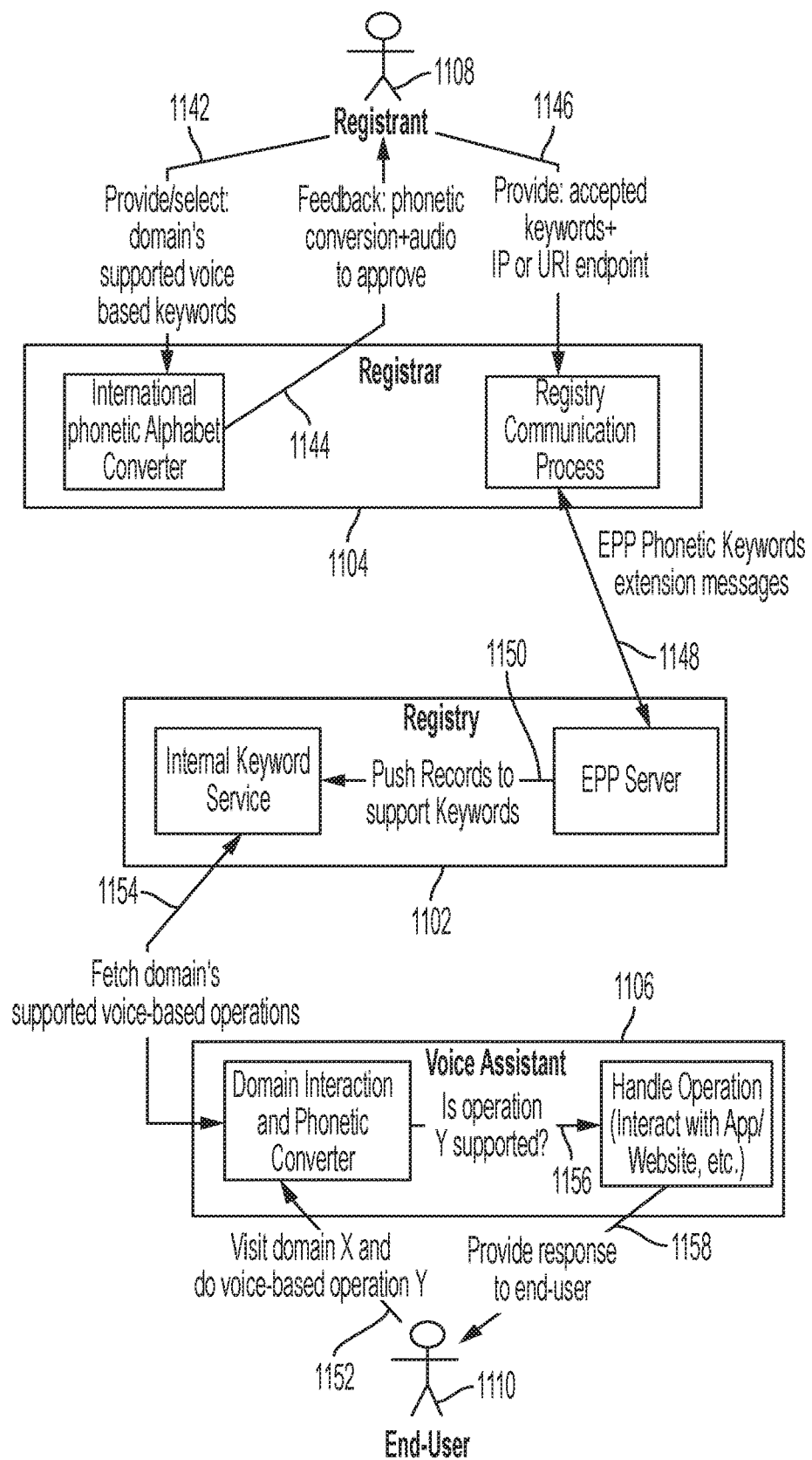
FIG. 11 is a schematic diagram of techniques for storing key-value pairs at a registry, and subsequently using such key-value pairs stored at a registry, according to various embodiments.

FIG. 11 is a schematic diagram of techniques for storing key-value pairs at registry 1102, and subsequently using such key-value pairs stored at registry 1102, according to various embodiments. Some embodiments for the techniques of FIG. 11 utilize an Extensible Provisioning Protocol (EPP) pronunciation keyword object extension to handle phonetic exchanges between registrar 1104 and registry 1102. Examples of EPP query and transform commands, and their responses, follow.

The following are descriptions of example EPP Query commands for pronunciation keyword extensions denoted herein as "Check", "Info", and "Transfer". A "Check" request accepts as arguments one or more domain names and one or more text and phonetic keywords pairs to check for respective domain names, e.g. Check(somedomain.tld, <calendar, kælender>). A "Check" response is "1" for each phonetic keyword that is supported by the queried domain name, and "0" for any unsupported keywords. An "Info" request accepts as arguments a domain name. An "Info" response returns the domain name and any associated pairs of text and phonetic keywords. "Transfer" semantics do not directly apply to Pronunciation Keywords.

The following are descriptions of example EPP Transform commands for pronunciation keyword extensions denoted herein as "Create", "Delete", "Renew", "Transfer", and "Update". A "Create" request accepts as arguments a domain name and one or more tuples of <text, phonetic encoded keywords, endpoint that supports operation>. A "Create" response returns the domain name and a creation date. Text and phonetic pairs are included to facilitate the possibility of accessing the keywords in a grapheme-based environment, e.g. list "calendar" in text on a webpage of supported operations but supply "kælender" over an audio system. A "Delete" request accepts as arguments a domain name. The "Delete" request removes all pronunciation keywords. A "Delete" response includes an EPP status code. "Renew" semantics do not directly apply to Pronunciation Extension. "Transfer" semantics do not directly apply to Pronunciation Keyword objects as they are subordinate to a Domain object. An "Update" request accepts as arguments a domain name a d at least one tuple of <text, phonetic encoded keywords, endpoint that supports operation> to add or remove from a domain name. An "Update" response returns a status code referring to the outcome of the update request.

For embodiments in which key-value pairs are stored at a registry, the registry may be the authoritative source for the pronunciation keyword information and where to send a user when a keyword match is found. Accessing this information may come directly, i.e., via a stand-alone API service to access this information or provide EPP hooks for voice-based platforms to access such information. Accessing this information could also, or alternatively, come indirectly, i.e., by having the registrar handle the user interactions, but storing the information in the registry.

As shown in FIG. 11, a registrant 1108 for a domain name may provision a registry 1102 with key-value pairs through a registrar 1104 for the domain name as follows. At 1142, registrant 1108 provides registrar 1104 with voice-based keywords (and/or key phrases) for voice-enabling the domain name. Registrar 1104 converts the keywords/phrases to phonetic representations, e.g., using an IPA converter. At 1144, registrar 1104 provides feedback to registrant 1108 in the form of the phonetic representations and/or audio for approval. At 1146, registrant 1108 provides approval for the provided representations (and/or audio) and also supplies corresponding values, e.g., URIs, for each. At 1148, registrar 1104 engages in a registry communication process with an EPP server of registry 1102 to provision key-value pairs that include the phonetic representations in association with the values. At 1150, registry 1102 pushes DNS records to support the key-value pairs to an internal keyword service. This completes the provisioning portion of the example process.

As further shown in FIG. 11, in use, an internet end user 1110 instructs a voice assistant 1106 to visit the website for the domain name which provisioning is described above and engage in a specified voice-based operation. Voice assistant 1106 communicates with registry 1102, e.g., using an EPP Info command, to check whether the requested operation is supported by the website for the domain name. At 1156, voice assistant 1106 uses the returned information to confirm that the requested operation is supported, and, if so, proceeds to handle the request by providing a response, at 1158, to end user 1110. The response may include an audio confirmation that the voice assistant 1106 has handled the requested voice operation, along with any associated results of the operation.

Figure 12:
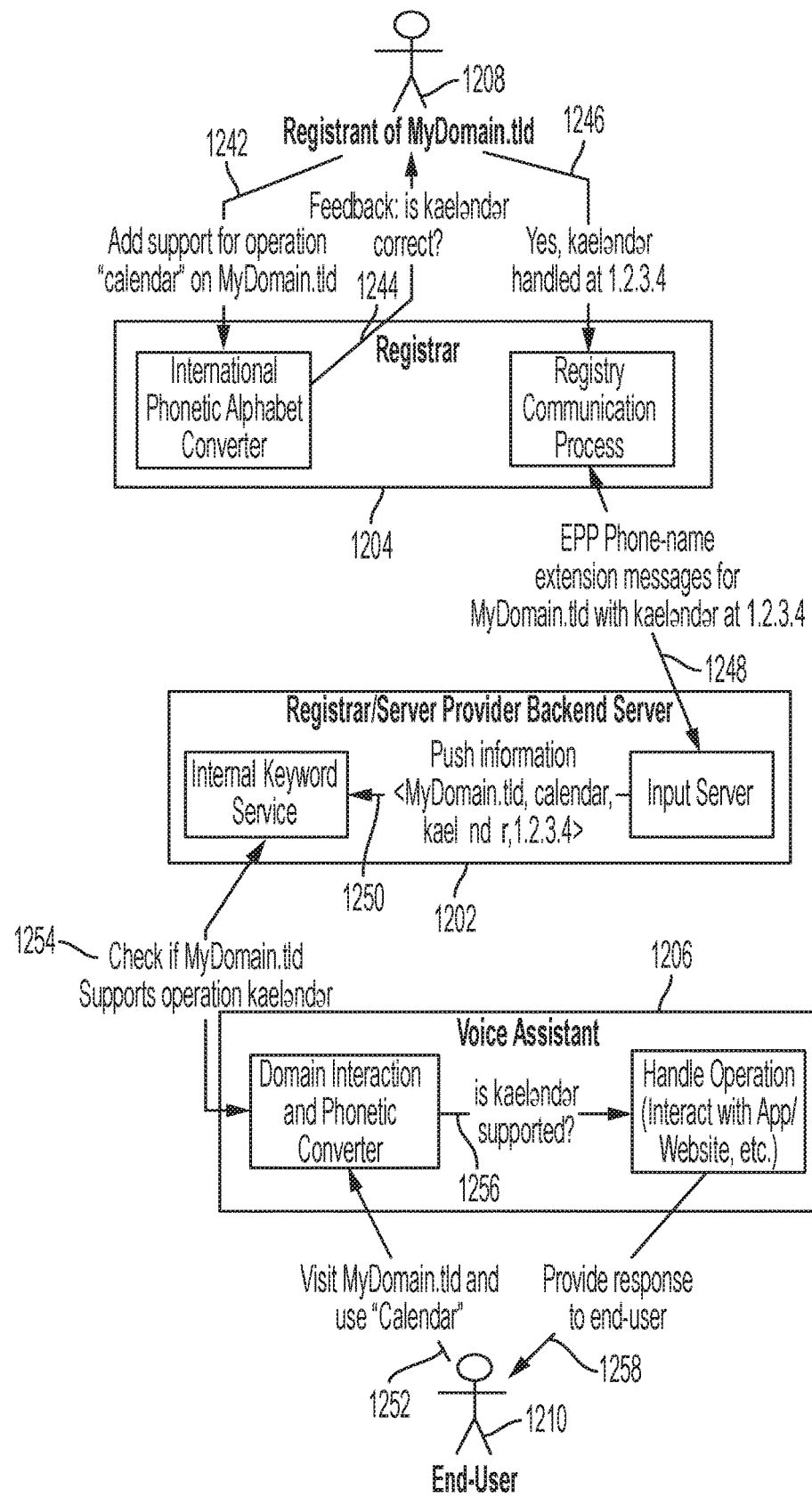
FIG. 12 is a schematic diagram of techniques for storing key-value pairs at a registrar or service provider, and subsequently using such key-value pairs stored at a registry or service provider, according to various embodiments.

FIG. 12 is a schematic diagram of techniques for storing key-value pairs at a registrar 1202 or service provider, and subsequently using such key-value pairs stored at a registry or service provider, according to various embodiments. According to an embodiment, although FIG. 12 is described in reference to an example registrar 1202, the subject matter shown in FIG. 12 and its description herein applies to, and may be implemented by, a DNS service provider instead of registrar 1202.

To store the keyword information at a registrar backend server 1202 (and/or at a service provider backend server), registrar 1204 may include, or utilize, a system to generate phonetic representations of keywords for a particular domain name. A suitable system may be an IPA converter, for example. Such a system accepts input keywords and outputs phonetic representations thereof. Registrar 1204 may store the input keywords in association with at least the output phonetic representations at registrar backend server 1202. For example, a user may input to registrar 1204 the keyword <calendar> for MyDomain.tld and may accept kælender as an acceptable phonetic sound; the user may also specify an endpoint to handle this particular keyword, e.g., a URI or an IP address. Thus <MyDomain.tld, calendar, kælender, [destination]> may be stored by the registrar backend server 1202, where [destination] is an endpoint such as a URI or IP address associated with the keyword and its phonetic representation. This information may then be exposed via an API for consumption.

Notifying a voice assistant 1206 that the registrar 1204 (and/or service provider) has the keyword information could occur in several ways. Some embodiments utilize a special DNS record (e.g. an existing but specially-formatted TXT DNS record, or a specialized voice-keyword record) that indicates that voice keywords can be retrieved at the registrar or service providers and handled at a particular endpoint (IP or URI). According to some embodiments, HTML on a domain name's website may have a meta tag that indicates the location of a voice keyword authority. According to some embodiments, an out-of-band approach may be used, e.g., voice platforms may partner with registrars or service providers to provide this service.

As shown in FIG. 12, a registrant 1208 for a domain name may provision a registrar backend server 1202 with a key-value pair through a registrar 1204 for the domain name as follows. At 1242, the registrant 1208 may interface with registrar 1204, e.g., via an online graphical user interface, to request that it add voice-enablement for the word "calendar" to their registered domain name. The registrar 1204 then generates a corresponding phonetic representation, e.g., using an IPA converter. At 1244, the registrar 1204 passes the phonetic representation to the registrant 1208 for confirmation as to whether it is an acceptable representation for the keyword supplied by the registrant at 1242. If the registrant 1208 responds in the negative, then the registrar 1204 may attempt to supply an alternative. Otherwise, the registrant 1208 responds in the affirmative at 1246, and also passes an endpoint (e.g., a URI or IP address) in the response. A registrar communication process of registrar 1204 then, at 1248, passes an EPP message that includes a key-value pair representing the keyword, its phonetic representation, and the endpoint to an input server of the registrar's backend server 1202. At 1250, the input server pushes the key-value pair to its internal keyword service, where the information is stored for later use. This concludes the key-value pair provisioning.

Also shown in FIG. 12, in use, at 1252 an internet end user 1210 may instruct a voice assistant 1206 to visit the website for the domain name for which provisioning is described above and engage in a specified voice-based operation. A domain interaction and phonetic converter component of the voice assistant 1206 may generate a phonetic representation of the received keyword, and, at 1254, the domain interaction and phonetic converter component of the voice assistant 1206 may communicate with the registrar back-end server 1202 to determine whether the phonetic representation is supported for the specified domain name. If not, voice assistant 1206 may respond to end-user 1210 with an error message. If so, then, at 1256, the voice assistant 1206 interacts with the corresponding voice-enabled webpage using the specified endpoint. At 1258, the voice assistant 1206 passes any response to the end user 1210, e.g., audibly.

Figure 13:
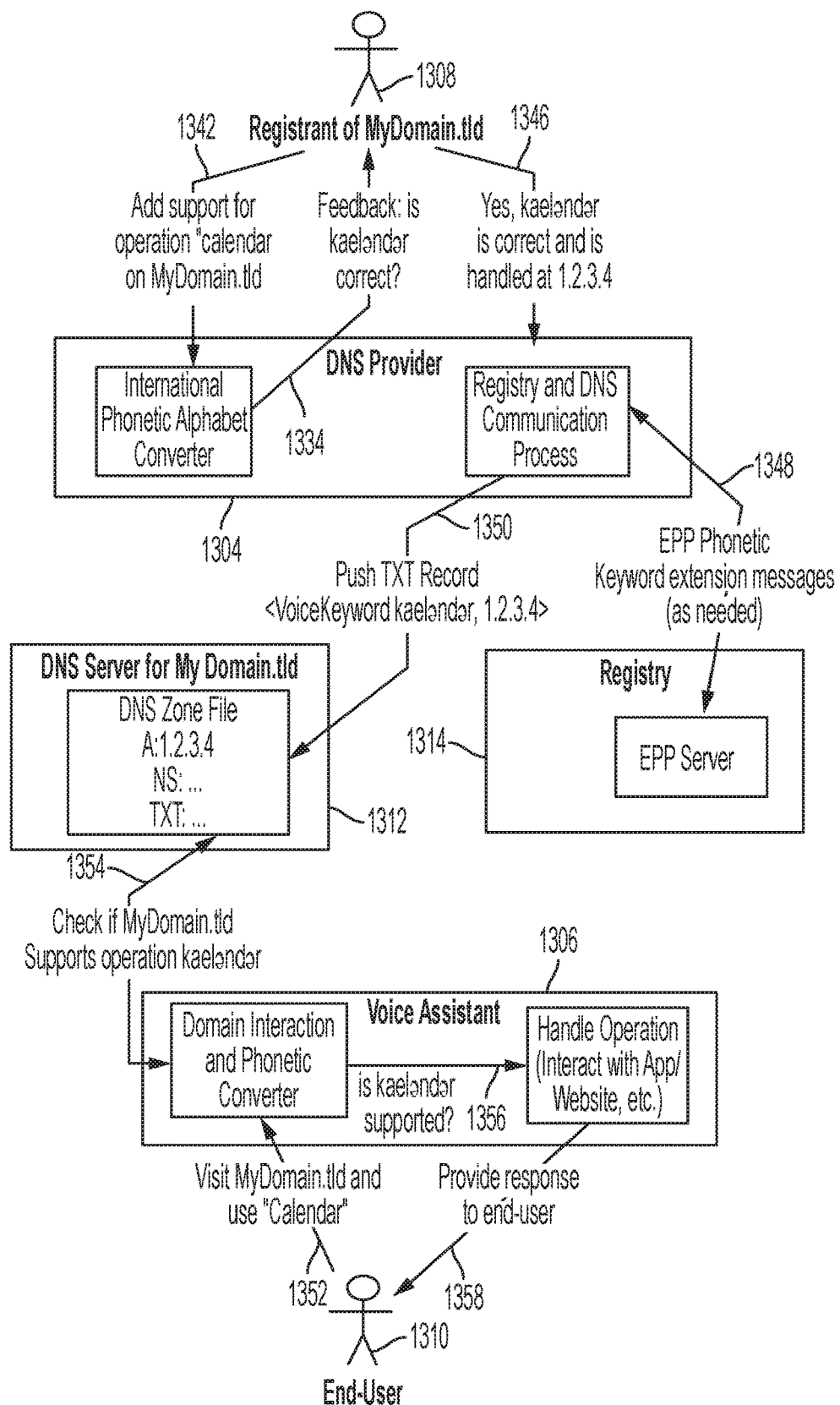
FIG. 13 is a schematic diagram of techniques for storing key-value pairs in the DNS, and subsequently using such key-value pairs stored in the DNS, according to various embodiments.

FIG. 13 is a schematic diagram of techniques for storing key-value pairs in the DNS, and subsequently using such key-value pairs stored in the DNS, according to various embodiments. To store the keyword information in the DNS, DNS TXT records may be utilized, because they support arbitrary key=value pairings. For keyword pronunciations, the key name may be standardized and the value may include the phonetic string and an IP or URI endpoint that hosts that voice keyword. Multiple keywords can be supported by separating with commas, e.g. "voice-keywords=<phonetic_1>,<phonetic_2>,<phonetic_3>" or by having multiple DNS TXT records.

According to an embodiment, the DNS may restrict the key and value to printable ASCII characters, so a phonetic pronunciation should be converted and stored as an ASCII friendly string, e.g., punycode or UTF-8 encoded string. By way of an IP-based example, the keyword "calendar" has an IPA phonetic representation of kælender, which is hosted at 1.2.3.4. This may be stored in a DNS TXT record as "domain-phonetic=\x6B\xC3\xA6\x6C\xC9\x99\x6E\x64\xC9\x99\x72,1.2.3.4" if UTF-8 encoding were used or "domain-phonetic=xn--klndr-sra21xca,1.2.3.4" if punycode is used. By way of a URI-based example, "daily wine deals" has an IPA representation of "deɪli waɪn dilz", which is hosted at wine.tld. This may be stored in a DNS TXT record as "domain-phonetic=xn--deliwandilz-c2ee22k,wine.tld/daily" if punycode is used. Then, when a user tries to use that phrase, the voice-based device will query its DNS records, identify the phrase, and forward the user to the URI specified.

As shown in FIG. 13, a registrant 1308 for a domain name may provision the DNS with a key-value pair for the domain name as follows. Note that, as shown, the DNS may include, for the domain name at issue, a DNS provider 1304, a DNS registry 1314, and a DNS server 1312. At 1342, the registrant 1308 may interface with the DNS provider 1304, e.g., via an online graphical user interface, to request that it add voice-enablement for the word "calendar" to their registered domain name. The DNS provider 1304 may generate a corresponding phonetic representation, e.g., using an IPA converter. At 1344, the DNS provider 1304 passes the phonetic representation to the registrant 1308 for confirmation as to whether it is an acceptable representation for the keyword supplied by the registrant at 1342. If the registrant 1308 responds in the negative, then the DNS provider 1304 may attempt to supply an alternative. Otherwise, the registrant 1308 responds in the affirmative at 1346, and also passes an endpoint (e.g., a URI or IP address) in the response. At 1348, the DNS provider 1304 uses an EPP message to pass a key-value pair that includes the keyword, its phonetic representation, and an endpoint, to the DNS registry 1314 for the keyword, e.g., through an EPP server. Further, at 1350, the DNS provider 1304 pushes the key-value pair to the DNS server 1312 for the domain name, e.g., in a DNS TXT record. The DNS server 1312 stores the DNS TXT record in association with the domain name. This concludes the key-value pair provisioning.

Also shown in FIG. 13, in use, at 1352 an internet end user 1310 instructs a voice assistant 1306 to visit the website for the domain name for which provisioning is described above and engage in a specified voice-based operation. A domain interaction and phonetic converter component of the voice assistant 1306 generates a phonetic representation of the received keyword, and, at 1354, the domain interaction and phonetic converter component of the voice assistant 1306 communicates with the DNS server 1312 to determine whether the phonetic representation is supported for the specified domain name. If not, the voice assistant 1306 responds to end-user 1310 with an error message. If so, then, at 1356, the voice assistant 1306 interacts with the corresponding voice-enabled webpage using the specified endpoint. At 1358, the voice assistant 1306 passes any response to the end user 1310, e.g., audibly.

Figure 14:
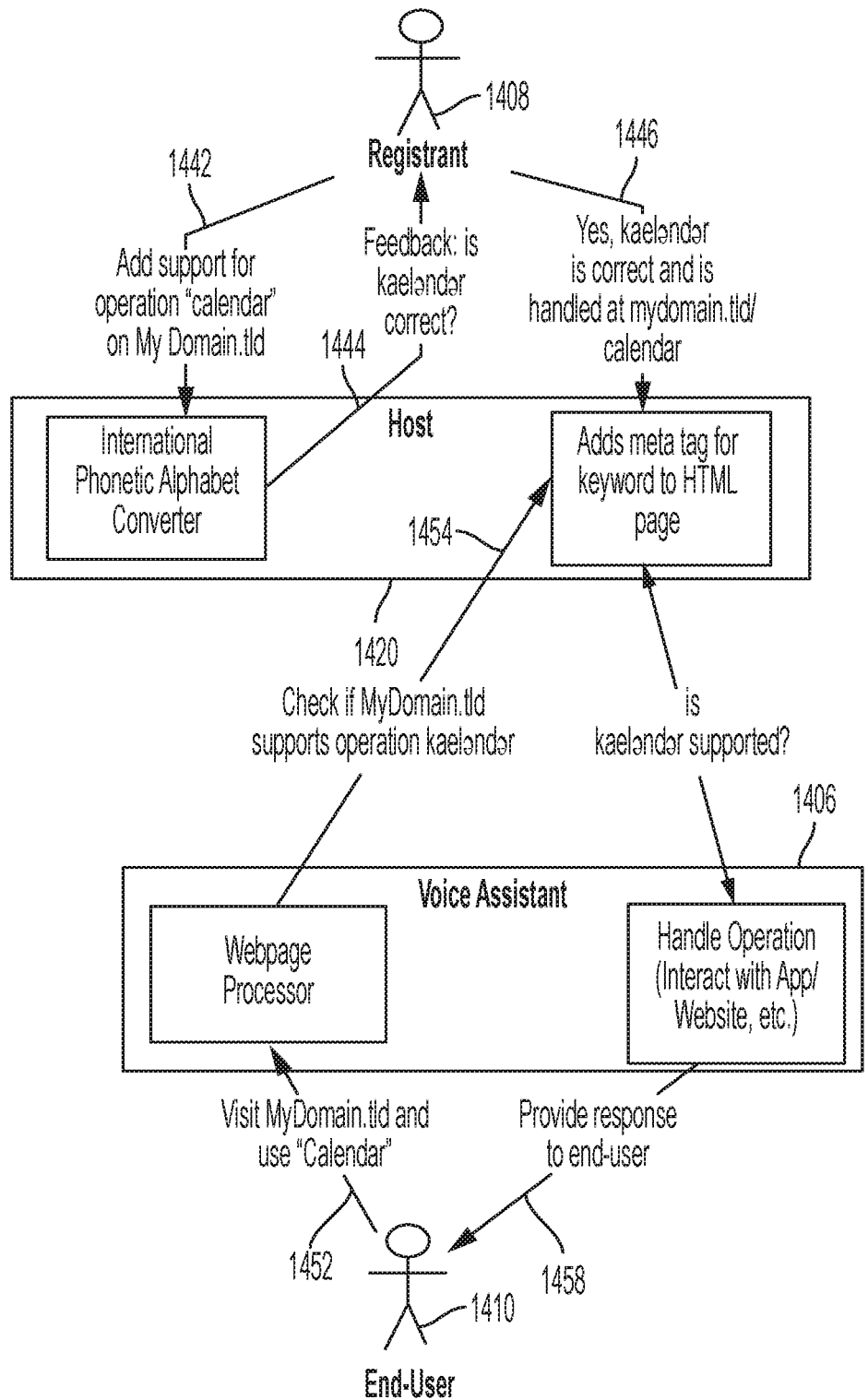
FIG. 14 is a schematic diagram of techniques for storing key-value pairs at a webserver host for a domain name, and subsequently using such key-value pairs stored at such a webserver, according to various embodiments.

FIG. 14 is a schematic diagram of techniques for storing key-value pairs at a webserver host 1420 for a domain name, and subsequently using such key-value pairs stored at such a webserver, according to various embodiments. To store the keyword information on the domain name's webserver host 1420, supported operations may be included directly on a webpage, i.e., in the HTMP code for the webpages stored at the webserver host 1420, in the form of an HTML <meta> tag markup. In such a configuration, a valid pronunciation meta tag for the term "calendar" may appear in the form <meta property="voice-keyword-calendar" value="kælender" endpoint=" . . . "/>. Note that the HTML may to use the UTF-8 charset, otherwise a conversion to an ASCII friendly format, such as punycode, may be used. Alternatively, information may be stored server-side at webserver host 1420 in a standardized endpoint, e.g. /voiceKeywords. Querying this endpoint returns supported keyword operations. According to an embodiment, regardless as to the specific storage technique, a new HTTP header message may be included that indicates support for voice-based operations, e.g. "Voice-Based-Support". When this header is included, voice assistant 1406 has an indication that this domain includes support for voice-based operations.

As shown in FIG. 14, a registrant 1408 for a domain name may provision the webserver host 1420 for the domain name with a key-value pair for the domain name as follows. At 1442, the registrant 1408 may interface with the webserver host 1420, e.g., via an online graphical user interface, to request that it add voice-enablement for the word "calendar" to their registered domain name. The webserver host 1420 generates a corresponding phonetic representation, e.g., using an IPA converter. At 1444, the webserver host 1420 passes the phonetic representation to the registrant 1408 for confirmation as to whether it is an acceptable representation for the keyword supplied by the registrant at 1442. If the registrant 1408 responds in the negative, then the webserver host 1420 may attempt to supply an alternative. Otherwise, the registrant 1408 responds in the affirmative at 1446, and also passes an endpoint (e.g., mydomain.tld/calendar or an indication that the voice-enabling information is stored in the HTML code for the webpage) in the response. The webserver host 1420 then provisions the provided information at either the provided endpoint or in the HTML code, e.g., as one or more metatags. This concludes the key-value pair provisioning.

Also shown in FIG. 14, in use, at 1452 an internet end user 1410 instructs a voice assistant 1406 to visit the website for the domain name for which provisioning is described above and engage in a specified voice-based operation. A domain interaction and phonetic converter component of the voice assistant 1406 generates a phonetic representation of the received keyword, and, at 1454, the domain interaction and phonetic converter component of the voice assistant 1406 communicates with the webserver host 1420 for the domain name to determine whether the phonetic representation is supported. If not, the voice assistant 1406 responds to end-user 1410 with an error message. If so, then, at 1456, the voice assistant 1406 interacts with the corresponding voice-enabled webpage. At 1458, the voice assistant 1406 passes any response to the end user 1410, e.g., audibly.

III. Variations, Extensions, and Use Cases

A. Establishing User Identity

Figure 15:
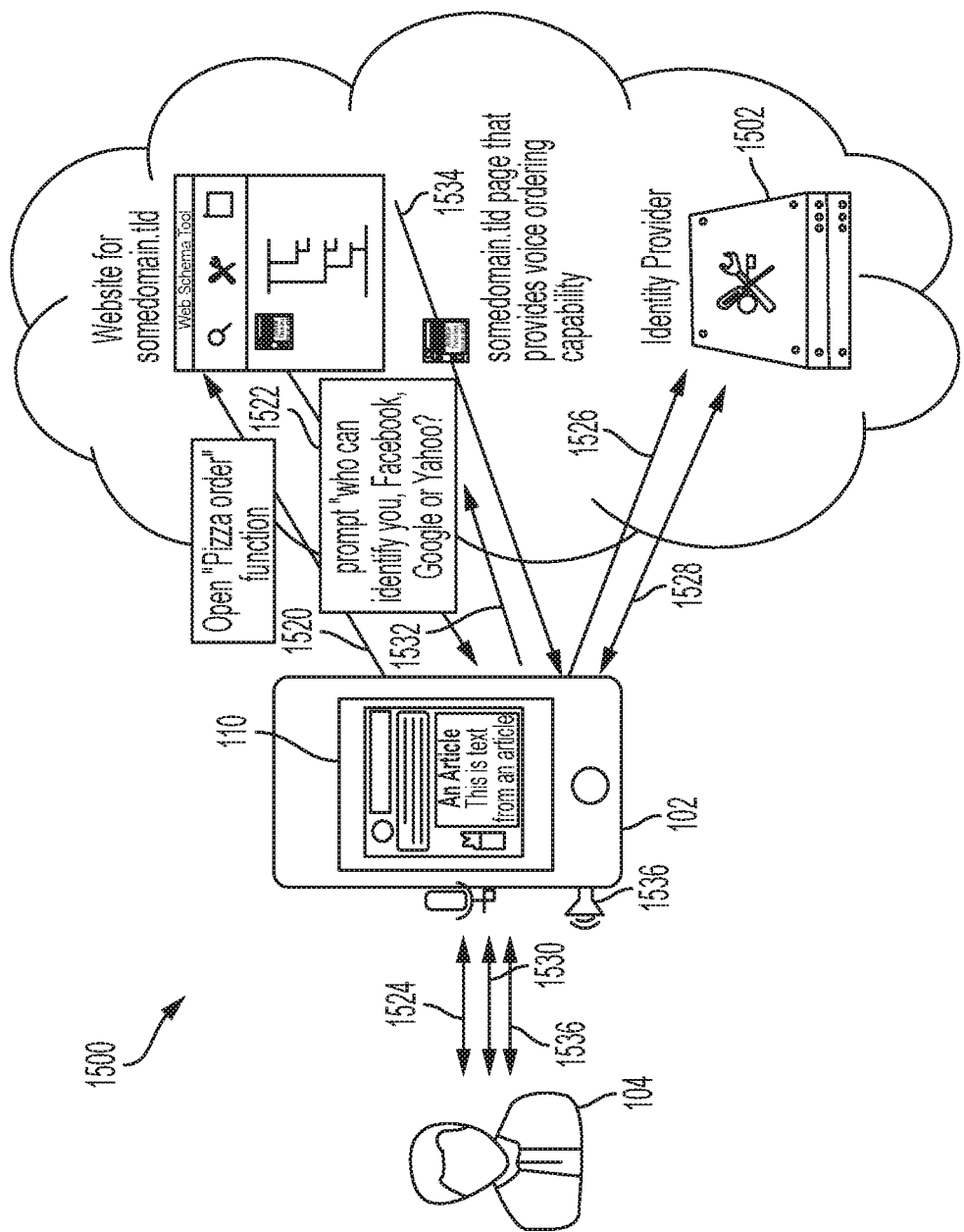
FIG. 15 is a schematic diagram depicting techniques for establishing user identity in a voice-enabled webpage setting according to various embodiments.

FIG. 15 is a schematic diagram of a system 1500 for establishing user identity in a voice-enabled webpage setting according to various embodiments. In particular, some embodiments provide the ability for a voice-enabled webpage to verify a user's identity through the use of an identify provider. Such verification is useful, for example, when a user wishes to engage in a monetary transaction with the voice-enabled webpage. Like system 100 of FIG. 1, system 1500 of FIG. 15 includes user device 102 and voice assistant 110, utilized by user 104. System 1500, like system 200, includes webserver 108 that hosts a voice-enabled webpage. System 1500 may further include an identity provider 1502.

An example of the operation of system 1500 is described presently. The operation of system 1500 described as follows may begin with user 104 asking voice assistant 110 to open somedomain.tld and order a pizza. Voice assistant 110 interprets the request and, at 1520, causes user device 102 to send a request to the voice-enabled webpage at somedomain.tld to invoke an "order" function. Details of how this may be accomplished are shown and described herein in reference to FIGS. 3 and 4.

According to the present example, somedomain.tld requires the user 104 to be authenticated and authorized before it will allow the user 104 to order a pizza. The current user is not authenticated, so at 1522, the voice-enabled webpage for somedomain.tld hosted at webserver 108 sends a message that causes voice assistant 110 to prompt the user 104 at 1524 to choose an identity provider (e.g., Google, FB, Yahoo, . . . ). The user 104 may provide an audible response, which the voice-enabled webpage interprets by matching it to a key-value pair to identify an endpoint for a respective identity provide. The voice-enabled webpage then sends a redirect message to the user device 110. According to alternative embodiments, somedomain.tld may pick the identity provider rather than have the user prompted to pick one. It may, for example, default the identity provider based on prior selection of an identity provider by the user.

At 1526, the browser executing on the user device 110 is redirected to the selected identity provider 1502 with the redirect indicating that a voice interaction is in progress, together with an indication of the state of the voice interaction and an endpoint at somedomain.tld to use in returning an authentication token.

At 1528, the identity provider 1502 may send a message to user device 110 requesting authentication information, and at 1530, the voice-enabled webpage on the browser executing on the user device 110 interacts with the user via voice to authenticate the user.

On authenticating the user, the identity provider 1502 at 1532 may redirect the browser back to somedomain.tld at an endpoint given to it in the initial redirect from somedomain.tld. The redirect includes an indication that a voice interaction is in progress, the state of the interaction, and an authentication token provided by identity provider 1502. In processing the redirect from the identity provider 1502, somedomain.tld determines whether or not the person identified in the supplied authentication token can order. If so, the voice interaction continues at 1534 as indicated by the interaction state indicated in the redirect. At 1536, the user 104 completes the order.

According to some embodiments, conversation state information for the voice interaction may be stored in cookies rather than conveyed in requests. According to an embodiment, passing state information in the request allows the state to be relayed across domains, whereas cookies restrict state management to the domain owning the cookie.

According to an embodiment, the authentication and authorization depicted in FIG. 15 applies to at least the OAuth and OpenID Connect frameworks. Other similar authentication and authorization frameworks may be used in embodiments. Further, other methods defined by the OAuth and OpenID Connect frameworks may be used; the processing flow described above is just one of the ways these frameworks support. There are also standards for two-factor authentication that may be used in some embodiments.

According to an embodiment, prior account linking between an account established for the user device 110 of user 104 and an account with an identity provider (e.g., identity provider 1502) supported by the voice-enabled webpage of the website hosted by webserver 108 may be done to eliminate interacting with the identity provider 1502 at request time.

B. Transitioning Between Multiple Voice-Enabled Webpages

Figure 16:
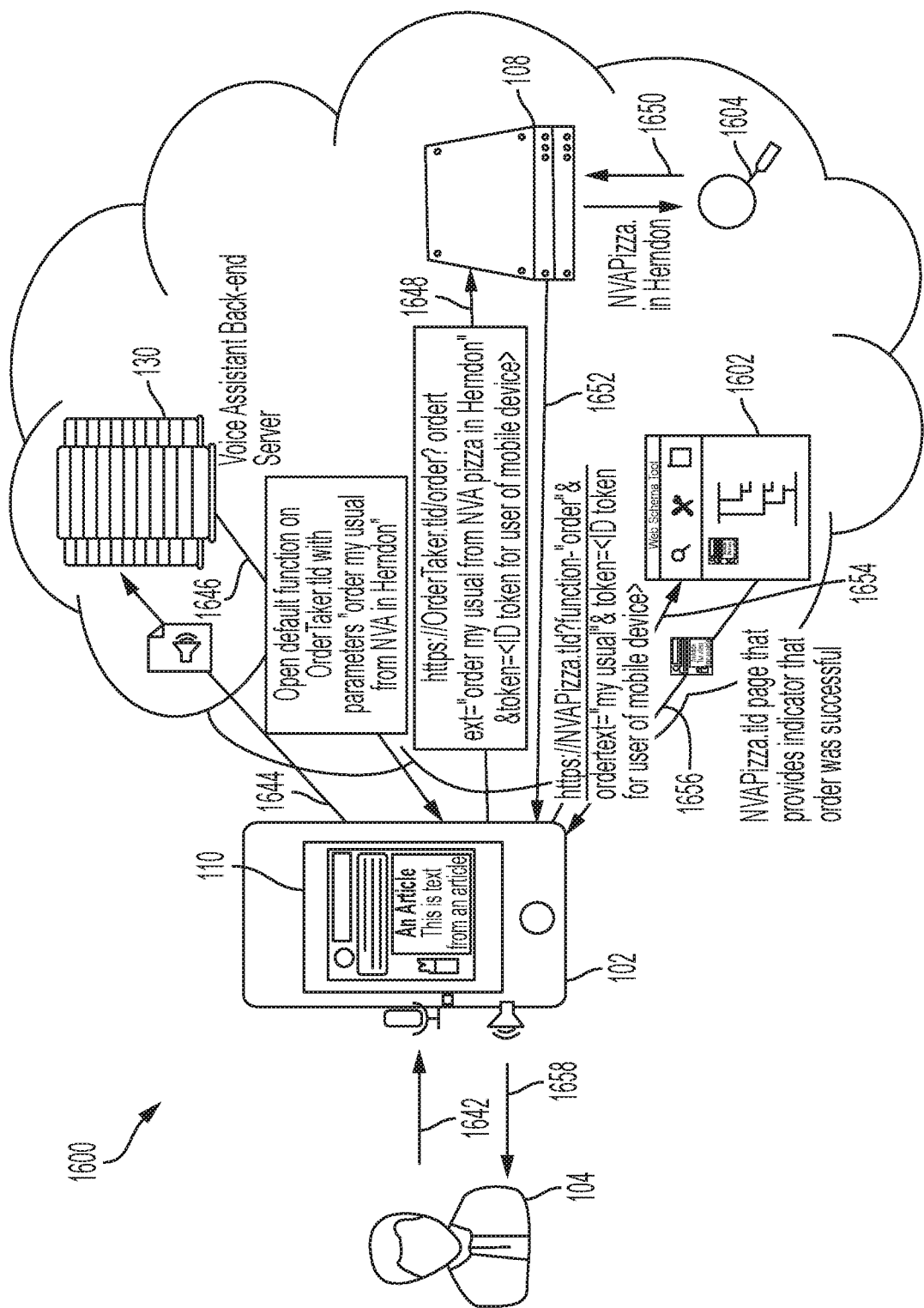
FIG. 16 is a schematic diagram of a system 1600 for conducting a voice interaction across multiple voice-enabled webpages, where the user specifies, to a first webpage, a second webpage, according to various embodiments.

FIG. 16 is a schematic diagram of a system 1600 for conducting a voice interaction across multiple voice-enabled webpages, where the user specifies, to a first webpage, a second webpage, according to various embodiments. In particular, some embodiments provide the ability for a first voice-enabled webpage to pass an ongoing voice interaction to a second voice-enabled webpage. Like system 100 of FIG. 1, system 1600 of FIG. 16 includes user device 102 and voice assistant 110, utilized by user 104. System 1600 includes webserver 108 that hosts a voice-enabled webpage, OrderTaker.tld, as well as a webserver 1602 that hosts a voice-enabled webpage NVAPizza.tld. System 1600 also includes, or utilizes, a search engine 1604.

An example of the operation of system 1600, where the user 104 orders a pizza from NVAPizza.tld through ordertaker.tld, is described presently. At 1642, the user 104 audibly asks the voice assistant 110 on the user device 102 to "ask OrderTaker.tld to order my usual from NVA Pizza in Herndon".

At 1644, the voice assistant 110 may relay audio of the command (and/or corresponding text) to voice assistant back-end server 130, which converts digital audio to text, if not already in possession of such text, and performs natural language processing to determine that user 104 wants to invoke "order" function of the voice-enabled webpage OrderTaker.tld.

At 1646, the voice assistant back-end server 130 may provide a response that directs the voice assistant 110 to pass the text "order my usual from NVA Pizza in Herndon" to the voice-enabled webpage OrderTaker.tld, which is hosted by webserver 108.

At 1648, the voice assistant 110 may send a request to OrderTaker.tld and passes the text "order my usual from NVA Pizza in Herndon". According to some embodiments, also included in the request is an authentication token for the user of the mobile device. Such an authentication token may be obtained as shown and described above in reference to FIG. 15. On receiving the request, OrderTaker.tld parses the request and determines that it will invoke the "order" function with parameter "my usual" from whatever domain is resolved by a search for "NVA Pizza in Herndon".

At 1650, OrderTaker.tld may search for "NVA Pizza in Herndon" using search engine 1604 and determine it resolves unambiguously to NVAPizzaHerndon.tld.

At 1652, OrderTaker.tld may send a redirect to the browser on the user device 102 so that, at 1654, it sends a request to the order function on NVAPizzaHerndon.tld with parameter "my usual" and an authentication token for the user. Such parameter passing may be accomplished as shown and described above in reference to FIG. 4, for example.

At 1656, the webserver 1602 for NVAPizzaHerndon.tld sends an order page to the browser after NVAPizzaHerndon.tld processes the order and parameters in the returned webpage indicate that the order was successful.

The order webpage sent to the browser does speech to text on load and, at 1658, audibly confirms to the user 104 that their order was placed.

According to an embodiment, the depicted flow of system 1600 has the voice assistant 110 receiving a directive command that is relayed via a redirect to the final target website, in the example, NVAPizza.tld. Other flows could have intermediate websites, such as OrderTaker.tld requesting user input and making control flow decisions based on that input. For example, the user 104 might not specify what they want to order, and OrderTaker.tld may audibly prompt the user for such information, that is, have a voice interaction with the user to allow the user to specify what they want to order.

Figure 17:
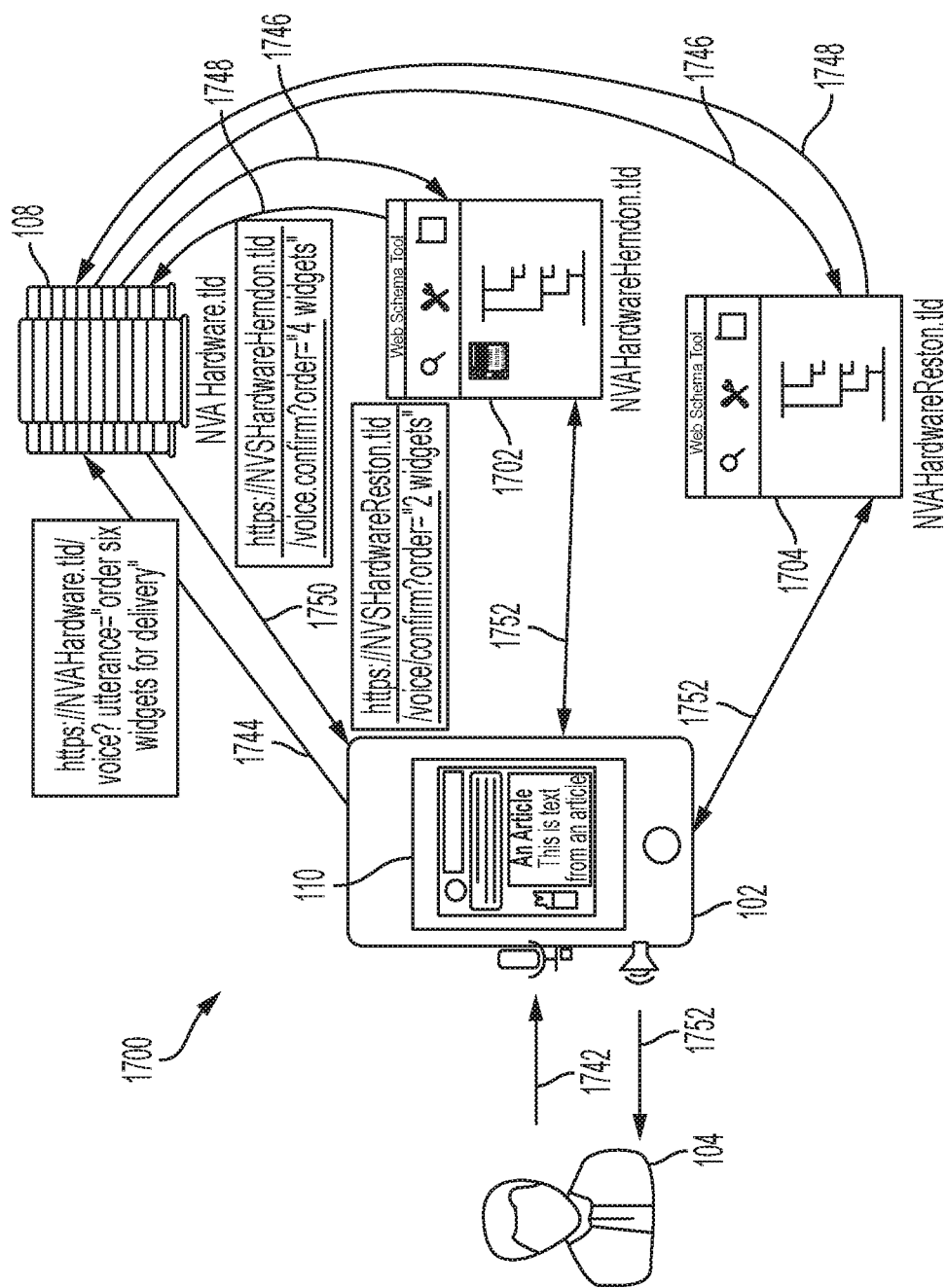
FIG. 17 is a schematic diagram of a system 1700 for conducting a voice interaction across multiple voice-enabled webpages, where a first webpage determines additional webpages, according to various embodiments.

FIG. 17 is a schematic diagram of a system 1700 for conducting a voice interaction across multiple voice-enabled webpages, where a first webpage determines additional webpages, according to various embodiments. In particular, some embodiments provide the ability for a first voice-enabled webpage to determine one or more additional webpages and pass to them an ongoing voice interaction. Like system 100 of FIG. 1, system 1700 of FIG. 17 includes user device 102 and voice assistant 110, utilized by user 104. System 1700 includes webserver 108 that hosts a first voice-enabled webpage, NVAHardware.tld, as well as a webserver 1702 that hosts a second voice-enabled webpage, NVAHardwareHerndon.tld, and a third webserver 1704 that hosts a third voice-enabled webpage, NVAHardwareReston.tld. An example of the operation of system 1700, where the user 104 orders six widgets from the first voice-enabled webpage 108, NVAHardware.tld, is described presently.

At 1742, the user 104 asks the voice assistant 110 on the user device 102 to "open NVAHardware.tld and order six widgets for delivery".

At 1744 the voice assistant 110 relays the utterance (in digital audio, text, or both) to NVAHardware.tld. The voice assistant 110 may do so by invoking a browser on the user device 102 with an invocation URI for NVAHardware.tld and providing with the invocation URI an indicator that a voice interaction is requested. The webserver 109 for NVAHardware.tld parses the invocation request and identifies the elements of the order request and that the voice interaction includes a request for order confirmation. It also determines that none of its stores have six widgets, but two of them combined (Herndon and Reston) can fulfill the order with Herndon capable of providing four widgets and Reston capable of providing two widgets.

At 1746, the NVAHardware.tld webserver 108 asynchronously relays order requests to the websites for each location, NVAHardwareReston.tld and NVAHardwareHerndon.tld, including in the requests an indicator that a voice interaction is to be used for confirmation and the interaction will be synchronized by NVAHardware.tld.

At 1748, once each website of webservers 1702, 1704 is ready to interact with the user 104 to provide the fulfillment interaction, they respond to the request from NVAHardware.tld with the response containing a URI to be invoked to provide the interaction.

At 1750, the webserver 108 for NVAHardware.tld handles the responses in the order they are received by doing browser redirects to the URIs provided in the responses and provides a redirect URI back to NVAHardware.tld on the redirect URIs.

At 1752, the webpages invoked by the redirects perform a voice interaction with the user 104 to confirm the order and schedule delivery. On completion, the webservers 1702, 1704 for the webpages do a redirect back to NVAHardware.tld using the redirect URI provided on the URI that invoked the voice interaction. NVAHardware.tld thus completes the transaction.

There are several variations on the technique described above for synchronizing interactions with the websites NVAHardwareReston.tld and NVAHardwareHerndon.tld. According to some embodiments, each confirming website may be launched in its own window or tab, and synchronization may be performed via a back-channel interaction with a synchronization service. According to some embodiments, the interactions with the confirming websites could be chained, such that each confirming website invokes the next confirming website once it was finished. According to some embodiments, NVAHardware.tld may return control back to the voice assistant 110 with the URIs for the confirming websites, and then the voice assistant 110 may manage the synchronization processes using the same approaches described above for NVAHardware.tld.

According to yet further embodiments, through the use of back-end APIs, multiple websites could all 'listen in' to the conversation and take turns 'speaking', so that the user 104 can interact with all of them in parallel, rather than in series. This may be emulated by the currently-interacting website posting a request with each of the other participating websites and, after speaking, doing a redirect to the first responding website that indicates it is ready to interact. Each speaking website would, in requests made to other websites, share what was spoken to the user and any user responses to prompts.

Figure 18:
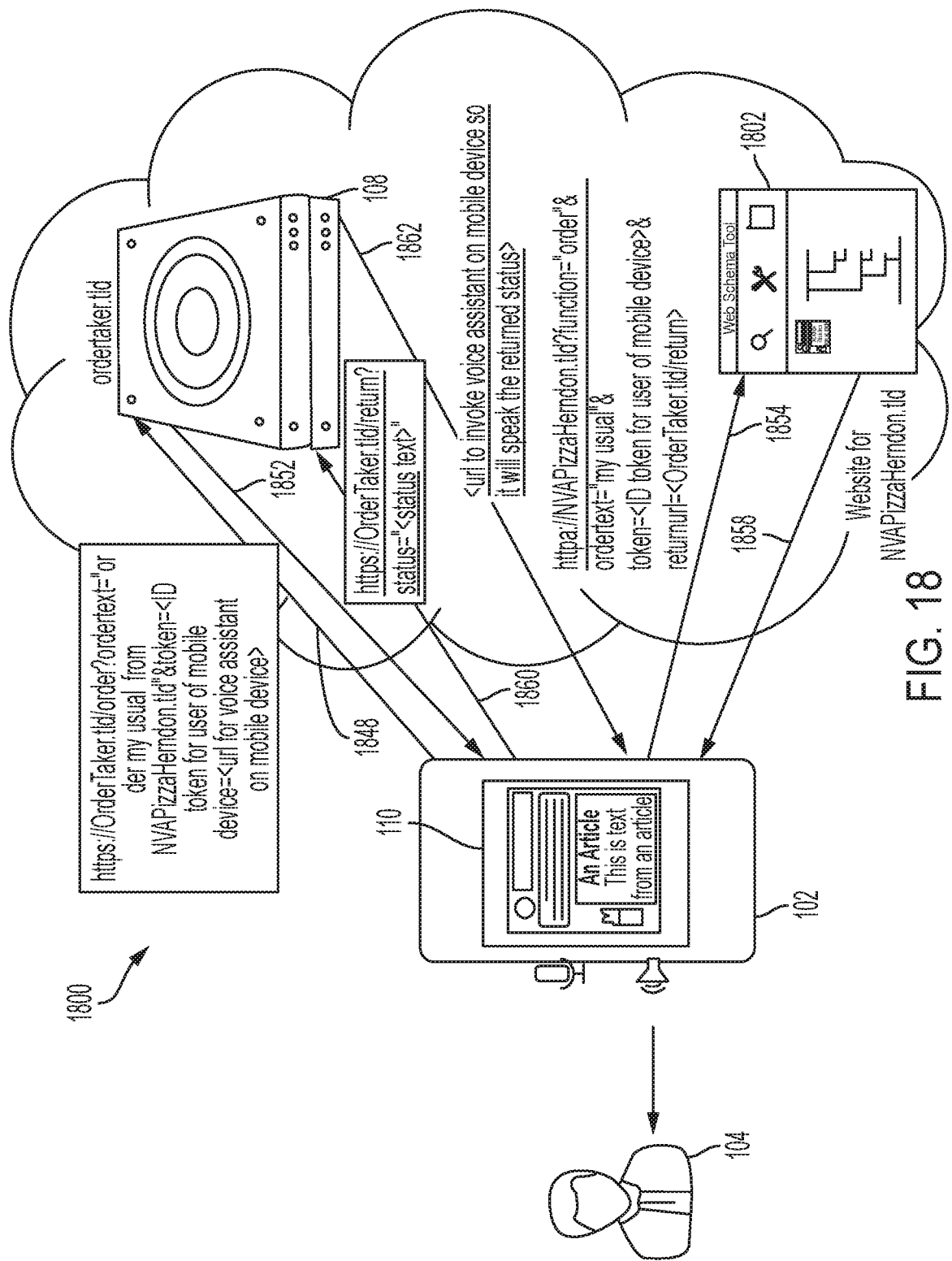
FIG. 18 is a schematic diagram of a system 1800 for voice return response propagation between multiple voice-enabled webpages according to various embodiments.

FIG. 18 is a schematic diagram of a system 1800 for voice return response propagation between multiple voice-enabled webpages according to some embodiments. In particular, FIG. 18 illustrates an alternative way to complete the interaction described above in reference to FIG. 16. System 1800 of FIG. 18 includes user device 102 and voice assistant 110, utilized by user 104. System 1800 includes webserver 108 that hosts a first voice-enabled webpage, OrderTaker.tld, as well as a webserver 1802 that hosts a second voice-enabled webpage, NVAPizza.tld An example of the operation of system 1800, where the user 104 orders pizza from NVAPizza.tld through the voice-enabled webpage (e.g. homepage) of OrderTaker.tld, is described presently.

The operation of system 1800 may begin as described above in reference to FIG. 16. In particular, the operation of system 1800 may begin with the actions of 1642, 1644, 1646, and 1648. The operation of system 1800 may continue as follows.

At 1848, as in 1648, the voice assistant 110 on the user device 102 creates and sends a request to OrderTaker.tld and passes the text "order my usual from NVAPizzaHerndon.tld". According to some embodiments, also included in the request is an identity token for the user 104 of the user device 102. Different from the operation of system 1600, as part of 1848, the request may further include a redirect URI for returning control to the voice assistant 110 on the user device 102.

On receiving the request, OrderTaker.tld parses the request and determines that it will invoke the "order" function with parameter "my usual" from whatever domain is resolved by a search for "NVA Pizza in Herndon". Thus, similar to 1650, OrderTaker.tld searches for "NVA Pizza in Herndon" (e.g., using a search engine such as search engine 1604 of FIG. 16) and determines that it resolves to NVAPizzaHerndon.tld, with an adequate confidence level that NVAPizza.tld is the desired domain name.

At 1852, similar to 1652, OrderTaker.tld sends a redirect to the browser on the user device 102 so that, at 1854 (similar to 1654), user device 102 sends a request to the voice ordering function on NVAPizzaHerndon.tld with parameter "my usual" and an authentication token for the user. Unlike 1654, here, the request further includes a redirect URI back to OrderTaker.tld. Also unlike 1654, OrderTaker.tld updates a cookie with the redirect URI it received from the Voice Assistant at 1848.

At 1858, NVAPizzaHerndon.tld provides a voice interaction as necessary with the user to complete the order and then redirects the browser on user device 102 to the redirect URI to OrderTaker.tld that it received from OrderTaker.tld at 1854. It includes in this redirect status text for the order.

At 1860, OrderTaker.tld receives the redirect and retrieves the redirect URI for the Voice Assistant on the mobile device from the cookie it previously saved.

At 1862, OrderTaker.tld redirects the browser on the user device 102 using the voice assistant URI and passes the status text on the URI. Finally, the browser processes the redirect to the voice assistant and launches the voice assistant with a parameter that has it speak the status text to the user. Alternately, some embodiments may use JavaScript on a returned webpage to speak the response back to the user.

Note that the depicted flow has the status response from the target domain being relayed as text all the way back to the voice assistant 110 so that it may speak the response. Alternately, the target domain or any intermediaries could speak the response, and a status indicator could be provided that indicates to the intermediary any other processing they might need to do, such as indicate an error or abandonment of the transaction.

C. Non-Browser Interactions Between Voice Assistants and Voice-Enabled Webpages

As set forth herein, some embodiments provide a continuing interaction, starting with a voice assistant on a user device and continuing via a voice interface provided by a voice-enabled webpage accessed by an on-device web browser. However, embodiments are not so limited. Some embodiments may be implemented using dedicated voice assistant devices that do not provide a web browser. Such embodiments may also be implemented on devices that lack a web browser. Further, such embodiments may be implemented on devices that include a web browser, but without invoking such a web browser.

Voice assistants of such embodiments may operate as follows. A voice assistant may open a website with an indicator to the website that the device of the voice assistant does not have a browser or does not want to use the browser. In such embodiments, the voice assistant may indicate options that it supports for a voice interaction with the website including, by way of non-limiting example, the following. Some embodiments provide support for data exchanges between the voice assistant and the website, where the website provides content to be spoken to the user, or to prompt the user with, and for the voice assistant to provide user utterances to the website. Some embodiments provide support for the voice assistant acting as an audio input/output device for the website. In such embodiments, the voice assistant may provide audio it captures to the website as well as play to the user audio it receives from the website. According to some embodiments, a voice assistant may be configured by a website such that during the interaction, various parameters affecting the voice interaction could be set such as: timeout for the user to respond to prompts, ceding of some capabilities to the voice assistant such as repeating incoming or outbound audio upon user request, and enabling the voice assistant to keep a transcript and how to handle transcripts.

Upon receiving indicators that a non-browser (e.g., pure voice) interaction is requested, a website response might provide any of the following, by way of non-limiting example. Such a website may provide indicators of what requested capabilities the website supports and/or qualifiers on those capabilities. Such a website may provide indicators as to additional voice-related capabilities the website supports. Such a website may provide indicators as to required authentication and authorization and accepted protocols for authentication and authorization.

D. Audible Trust Indicators

A user that begins interacting with a voice interface of a voice-enabled webpage as part of a continuous interaction initiated with a voice assistant may not have the same level of confidence that they should trust the interaction as they would have in a standard visual interaction with a webpage. For example, users may not be able to see the URI containing the domain name of the website. Users may not be able to determine whether or not the interaction is taking place on an encrypted channel. Users may not be sure of the identity of a website launched due to a search or based on other mechanisms in which the domain name of the website was not spoken by the user. And users may find it hard to detect a website with a sound-alike domain that is spoofing the website the user actually wanted.

In the above cases, it would be to the user's benefit to have trusted assurance that the website they are interacting with is the one they desired to interact with. To that end, the following mechanisms may be employed by any embodiment disclosed herein. An out-of-band indicator or user interaction may be provided to the user by a trusted third-party. For example, a certificate verification service might be invoked to examine a certificate provided by a website to the voice assistant and, after examining the certificate, the certificate verification service may send a notification to the user via SMS or email. for example, identifying the domain name of the website. In another example, the user may interact with the website to determine if it knows a shared secret that was previously established by the user and then use this determination in identifying the website. The voice assistant may provide a function for inquiring about the identity of the website, including audibly spelling the domain name and information about the owning entity. The voice assistant may provide a capability for assessing the reputation of the website. For example, a voice assistant may access or interact with a reputation service or a black-listed site service as part of determining the reputation of a website. The voice assistant may provide an indication as to whether the interaction with the website is encrypted, and may also provide indication as to the type of encryption, the protocol being used and the public key infrastructure being used.

E. Use of, and Interactions with, Search Engines

Currently, search engines are not configured to work well with voice interactions.

For example, search engines do not take into account that users typically use voice interactions for very specific purposes and know both the entity they want to interact with and action they want to perform. In this case, their search will explicitly or even implicitly identify the specific entity. However, search engines typically return a plurality of results in response to a requested search. Further, search engines do not account for situations where no search result is determined to have a high enough certainty that it should be returned as the single result of the search. Thus, search engines do not take into account that voice interactions work well when a single search result is returned, with high certainty that the search result is correct.

Other issues with search engines for voice interactions involve placeholder domains. Search engines generally eliminate from consideration domains that are "placeholders" that rely on other domains for most of their content or that do redirects to other domains. However, for voice interactions, placeholder domains may be useful for identifying specific targets within an entity, such as locations for a business with many branches. Placeholder domains therefore are subordinate to the "parent" domain of the owning entity, and processing is optimized if placeholder domains rely on the parent domain to provide content and processing functions that are common across placeholder domains.

These and other issues may be addressed by embodiments through the use of one or more of the following techniques. Embodiments that utilize search engines to identify domain names from audible user requests (e.g., 1650 of FIG. 16) may filter, rank, or otherwise process a plurality of search results in order to obtain the user-intended results (e.g., a domain name for 1650 of FIG. 16).

Search engines may be configured accept qualifiers or do detection that indicates the origin of a search (voice, browser, mobile, application, . . . ) and adapt the search engine results based on the origin of the search. That is, search engines may be configured to accept qualifiers that can be used to limit responses based on any, or a combination, of: relevance (certainty), a delta between the highest relevance and next highest relevance of ranked search results, and the number of results to return. Searches by or for voice interactions may use such qualifiers to identify domains that match with high certainty. Search engines might also default relevance evaluation for voice supplied searches. For example, when a relevance ranking threshold is not supplied as a qualifier, a search engine may by default identify that a domain identified by a search should be used for a voice interaction if the domain was marked at a 90% relevance ranking or higher.

Regarding search engines crawling the web to acquire data for future searches, the following approaches may be employed to better facilitate voice-enabled webpages appearing in search results. A domain name may have an indication that it provides voice services so that search engine optimization may take that into account in ranking search results, e.g., for voice-initiated searches. Such an indication may be provided in the DNS, via meta-data embedded in a webpage for the domain name, or via a manifest of services provided for a domain, for example. Further, a registry of "placeholder" domains may be maintained with a registration process insuring that the domains are legitimate to supporting the voice functionality the registrant wishes to offer. Such a registry might be used by search engines as an indicator that matches for these domains in search results are legitimate.

F. Alternatives to Voice Assistants

A variety of applications on user devices may provide voice interfaces. Such applications include, by way of non-limiting example, games, voice-enabled chatrooms, maps, note-taking, etc. Such applications may be configured to provide the user with a capability for interacting with a voice assistant or a voice-enabled domain, e.g., via a visual link, via a prompt (audible or visual), based on intent detection from something a user spoke, or based on context. In such cases, an on-device API may be used to relay the utterance to the on-device voice assistant and cede control to the voice assistant. Alternatively, such an application may act as a voice assistant and provide the techniques disclosed herein for voice assistants.

Similar techniques may be used to invoke a voice interface or domain on a separate paired device. For instance, a game controller may be paired with a dedicated, or mobile-device-based, voice assistant.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer-readable medium(s) may be utilized. The computer readable medium may be a computer readable signal medium or a computer readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method of processing a voice initiated request by a web server, the method comprising:
   receiving, by a web server, request data representing a voice command to a user device, wherein the voice command comprises a domain name identifier for a webpage and at least one keyword associated with a function, wherein the request data comprises an identification of a webpage;

determining, by the web server, that a response to the request data will continue a voice interaction based on an identification of the at least one word and a comparison of the at least one word to a list of keywords associated with the domain name identifier; and providing, by the web server and to the user device, data for a voice enabled webpage associated with the webpage, wherein the data for the voice enabled webpage is configured to invoke a voice interface for the user device.

2. The method of claim 1, wherein the request data comprises textual data derived from the voice command.

3. The method of claim 1, wherein the determining comprises parsing the identification of the webpage for an indication that a response to the request data will continue a voice interaction.

4. The method of claim 1, wherein the determining comprises retrieving stored data representing that a response to the request data will continue a voice interaction.

5. The method of claim 1, wherein the request data further comprises at least one word, and wherein the determining further comprises identifying a uniform resource identifier (URI) of the voice enabled webpage from at least both the identification of the webpage and the at least one word.

6. The method of claim 5, wherein the identifying comprises retrieving data associating the at least one word and the identification of the webpage to the URI of the voice enabled webpage, wherein the retrieving data is from one of: a Domain Name System (DNS) registry for the webpage, a DNS registrar for the webpage, a web hosting provider for the webpage, or the web server.

7. The method of claim 1, further comprising, prior to the providing:
providing a redirect instruction and an indication of an in-progress voice interaction to an identity provider website, wherein the redirect instruction comprises a uniform resource identifier of the voice enabled webpage;
receiving identity information from the identity provider website; and
determining that the identity information indicates that a sender of the request data is authorized for an action on the voice enabled webpage.

8. The method of claim 1, wherein the request data further comprises an identification of a secondary webpage;
wherein the data for the voice enabled webpage is configured to invoke the voice interface on the user device to prompt a user for at least one parameter;
the method further comprising:
receiving, by the web server and from the user device, the at least one parameter; and
providing, by the web server and to the user device, a redirect instruction to the secondary webpage, the redirect instruction comprising an indication of an in-progress voice interaction and the at least one parameter.

9. The method of claim 8, further comprising:
receiving, by the web server and from the user device, a redirect response initiated by the secondary webpage, the redirect response comprising voice response data from the secondary webpage; and
passing the voice response data to the user device, whereby the voice interface of the user device audibly delivers the voice response data to the user.

10. The method of claim 1, wherein the data for the voice enabled webpage is configured to invoke the voice interface on the user device to prompt a user for at least one parameter, the method further comprising:
determining, by the web server, that a secondary webpage is implicated by the request data, wherein the data for the voice enabled webpage is configured to invoke the voice interface on the user device to prompt a user for at least one parameter;
receiving, by the web server and from the user device, the at least one parameter;
sending, by the web server and to a secondary web server for the secondary webpage, an indication of an in-progress voice interaction and an instruction to coordinate through the web server;
receiving, by the web server and from the secondary web server, a response comprising a uniform resource identifier for a secondary voice enabled webpage; and
sending, by the web server and to a sender of the request data, a first redirect instruction comprising the uniform resource identifier for the secondary voice enabled webpage, wherein the first redirect instruction further comprises a second redirect instruction comprising a uniform resource identifier for the web server.

11. The method of claim 1, further comprising:
providing, by the web server and to the user device, shared secret data for presentation by the voice interface of the user device.

12. The method of claim 1,
wherein the request data comprises at least one search qualifier, and
wherein the data for the voice enabled webpage comprises search results constrained by the at least one search qualifier.

13. The method of claim 1, wherein the data for the voice enabled webpage is configured to invoke the voice interface for the user device by invoking a voice assistant for the user device.

14. The method of claim 1, wherein the data for the voice enabled webpage comprises executable code comprising at least a portion of the voice interface for the user device.

15. The method of claim 1, further comprising receiving, by the web server, an authentication token associated with a user of the user device prior to the providing.

16. A system for processing a voice initiated request by a web server, the system comprising a web server configured to perform operations comprising:
receiving request data representing a voice command to a user device, wherein the voice command comprises a domain name identifier for a webpage and at least one word associated with a function, wherein the request data comprises an identification of a webpage;
determining that a response to the request data will continue a voice interaction based on an identification of the at least one word and a comparison of the at least one word to a list of keywords associated with the domain name identifier; and
providing, to the user device, data for a voice enabled webpage associated with the webpage, wherein the data for the voice enabled webpage is configured to invoke a voice interface for the user device.

17. The system of claim 16, wherein the request data comprises textual data derived from the voice command.

18. The system of claim 16, wherein the determining comprises parsing the identification of the webpage for an indication that a response to the request data will continue a voice interaction.

19. The system of claim 16, wherein the determining comprises retrieving stored data representing that a response to the request data will continue a voice interaction.

20. The system of claim 16, wherein the request data further comprises at least one word, and wherein the determining further comprises identifying a uniform resource identifier (URI) of the voice enabled webpage from at least both the identification of the webpage and the at least one word.

21. The system of claim 20, wherein the identifying comprises retrieving data associating the at least one word and the identification of the webpage to the URI of the voice enabled webpage, wherein the retrieving data is from one of: a Domain Name System (DNS) registry for the webpage, a DNS registrar for the webpage, a web hosting provider for the webpage, or the web server.

22. The system of claim 16, wherein the operations further comprise, prior to the providing:
providing a redirect instruction and an indication of an in-progress voice interaction to an identity provider website, wherein the redirect instruction comprises a uniform resource identifier of the voice enabled webpage;
receiving identity information from the identity provider website; and
determining that the identity information indicates that a sender of the request data is authorized for an action on the voice enabled webpage.

23. The system of claim 16, wherein the request data further comprises an identification of a secondary webpage;
wherein the data for the voice enabled webpage is configured to invoke the voice interface on the user device to prompt a user for at least one parameter;
wherein the operations further comprise:
receiving, from the user device, the at least one parameter; and
providing, to the user device, a redirect instruction to the secondary webpage, the redirect instruction comprising an indication of an in-progress voice interaction and the at least one parameter.

24. The system of claim 23, wherein the operations further comprise:
receiving, from the user device, a redirect response initiated by the secondary webpage, the redirect response comprising voice response data from the secondary webpage; and
passing the voice response data to the user device, whereby the voice interface of the user device audibly delivers the voice response data to the user.

25. The system of claim 16, wherein the data for the voice enabled webpage is configured to invoke the voice interface on the user device to prompt a user for at least one parameter, and where the operations further comprise:
determining that a secondary webpage is implicated by the request data, wherein the data for the voice enabled webpage is configured to invoke the voice interface on the user device to prompt a user for at least one parameter;
receiving from the user device, the at least one parameter;
sending, to a secondary web server for the secondary webpage, an indication of an in-progress voice interaction and an instruction to coordinate through the web server;
receiving, from the secondary web server, a response comprising a uniform resource identifier for a secondary voice enabled webpage; and
sending, to a sender of the request data, a first redirect instruction comprising the uniform resource identifier for the secondary voice enabled webpage, wherein the first redirect instruction further comprises a second redirect instruction comprising a uniform resource identifier for the web server.

26. The system of claim 16, wherein the operations further comprise:
providing, to the user device, shared secret data for presentation by the voice interface of the user device.

27. The system of claim 16,
wherein the request data comprises at least one search qualifier, and
wherein the data for the voice enabled webpage comprises search results constrained by the at least one search qualifier.

28. The system of claim 16, wherein the data for the voice enabled webpage is configured to invoke the voice interface for the user device by invoking a voice assistant for the user device.

29. The system of claim 16, wherein the data for the voice enabled webpage comprises executable code comprising at least a portion of the voice interface for the user device.

30. The system of claim 16, wherein the operations further comprise receiving an authentication token associated with a user of the user device prior to the providing.

* * * * *